(12) United States Patent
Nimura

(10) Patent No.: US 9,352,730 B2
(45) Date of Patent: May 31, 2016

(54) VEHICLE BRAKE CONTROL DEVICE

(71) Applicant: Kazunori Nimura, Toki (JP)

(72) Inventor: Kazunori Nimura, Toki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/433,275

(22) PCT Filed: Oct. 5, 2012

(86) PCT No.: PCT/JP2012/075899
§ 371 (c)(1),
(2) Date: Apr. 2, 2015

(87) PCT Pub. No.: WO2014/054164
PCT Pub. Date: Apr. 10, 2014

(65) Prior Publication Data
US 2015/0298664 A1    Oct. 22, 2015

(51) Int. Cl.
| | | |
|---|---|---|
| B60T 8/00 | (2006.01) | |
| B60T 8/17 | (2006.01) | |
| B60T 13/00 | (2006.01) | |
| B60T 8/36 | (2006.01) | |
| B60T 8/40 | (2006.01) | |
| B60T 8/171 | (2006.01) | |

(52) U.S. Cl.
CPC . *B60T 8/17* (2013.01); *B60T 8/171* (2013.01); *B60T 8/36* (2013.01); *B60T 8/4081* (2013.01); *B60T 8/3655* (2013.01); *B60T 2270/604* (2013.01)

(58) Field of Classification Search
USPC ........................................................ 701/70
See application file for complete search history.

(56) References Cited

U.S. PATENT DOCUMENTS

| | | | | |
|---|---|---|---|---|
| 4,805,104 A | * | 2/1989 | Kishimoto | ................ B60T 8/58 180/197 |
| 6,663,191 B2 | * | 12/2003 | Sakata | ................ B60T 8/24 303/20 |
| 8,303,046 B2 | * | 11/2012 | Nakata | ................ B60K 6/445 188/1.11 E |
| 8,855,882 B2 | * | 10/2014 | Yoshii | ................ B60T 13/52 701/70 |
| 9,120,470 B2 | * | 9/2015 | Harada | ................ B60T 7/12 |
| 9,168,902 B2 | * | 10/2015 | Yoo | ................ B60T 8/171 |

(Continued)

FOREIGN PATENT DOCUMENTS

| | | |
|---|---|---|
| JP | 2005 35466 | 2/2005 |
| JP | 2008 137586 | 6/2008 |

OTHER PUBLICATIONS

International Search Report Issued Dec. 25, 2012 in PCT/JP12/075899 Filed Oct. 5, 2012.

*Primary Examiner* — Yonel Beaulieu
(74) *Attorney, Agent, or Firm* — Oblon, McClelland, Maier & Neustadt, L.L.P

(57) ABSTRACT

When a brake pedal is slowly depressed, a brake ECU sets a target current iFL* of a pressure-increasing linear control valve for a front-left wheel to increase from a current value lower than a valve-opening current i open by a decrease set value i1, and sets a target current iFL* for a pressure-increasing linear control valve for a front-right wheel to increase from a current value lower than a valve-opening current i open by a decrease set value i2 (<i1). This prevents a timing at which the pressure-increasing linear control valve is closed and a timing at which the pressure-increasing linear control valve is closed from matching, whereby a variation in a vehicle deceleration G can be suppressed.

3 Claims, 8 Drawing Sheets

(56) References Cited

U.S. PATENT DOCUMENTS

| | | | | |
|---|---|---|---|---|
| 2001/0004723 | A1* | 6/2001 | Nishiyama | B60T 8/3215 701/79 |
| 2011/0006591 | A1* | 1/2011 | Yoshii | B60T 7/12 303/4 |
| 2014/0195118 | A1* | 7/2014 | Okubo | B60T 8/00 701/41 |
| 2014/0305751 | A1* | 10/2014 | Yamamoto | B60T 8/00 188/72.4 |
| 2015/0073678 | A1* | 3/2015 | Shimizu | B60T 8/1764 701/79 |
| 2015/0274143 | A1* | 10/2015 | Miyazaki | B60T 8/348 303/9.61 |
| 2015/0291141 | A1* | 10/2015 | Miyazaki | B60T 8/4081 303/10 |

* cited by examiner

FIG.2A

FRONT-LEFT WHEEL

START
↓
S11 — BRAKE REQUEST IS ISSUED?
 — No → S12: $i_{FL}^* = 0$ → END
 — Yes ↓
S13 — $E \geq E_{ref}$?
 — No → S12
 — Yes ↓
S14 — $V_p \leq V_{pref}$?
 — No → S15: FB CONTROL → END
 — Yes ↓
S20 — HYDRAULIC PULSATION PREVENTION CONTROL → END

FIG.2B

FRONT-RIGHT WHEEL

START
↓
S11 — BRAKE REQUEST IS ISSUED?
 — No → S12: $i_{FR}^* = 0$ → END
 — Yes ↓
S13 — $E \geq E_{ref}$?
 — No → S12
 — Yes ↓
S14 — $V_p \leq V_{pref}$?
 — No → S15: FB CONTROL → END
 — Yes ↓
S30 — HYDRAULIC PULSATION PREVENTION CONTROL → END

VEHICLE BRAKE CONTROL DEVICE

TECHNICAL FIELD

The present invention relates to a vehicle brake control device that controls a hydraulic pressure of a wheel cylinder by an electronic control apparatus.

BACKGROUND ART

A vehicle brake control device including a linear control valve on an operating-fluid flow path formed from a power hydraulic source to a wheel cylinder has conventionally been known, the device controlling energization of the linear control valve such that a hydraulic pressure of the wheel cylinder follows a target hydraulic pressure. For example, Patent Document 1 proposes a brake control device including a solenoid linear control valve (linear control valve including a pressure-increasing linear control valve and a pressure-decreasing linear control valve) for adjusting a hydraulic pressure for a wheel cylinder of each of front-left, front-right, rear-left, and rear-right wheels, wherein the hydraulic pressure of the wheel cylinder of each of the front-left, front-right, rear-left, and rear-right wheels is independently controlled by an energization control of the linear control valve. In the brake control device that controls a hydraulic pressure of a wheel cylinder of each wheel, a target hydraulic pressure according to a driver's brake operation is set, and a hydraulic pressure of each wheel cylinder is detected, wherein the energization control of the linear control valve according to a deviation between the target hydraulic pressure and the detected hydraulic pressure is performed independently for each wheel.

PRIOR ART DOCUMENT

Patent Document

Patent Document 1: Japanese Patent Application Laid-Open (kokai) No. 2005-35466

SUMMARY OF THE INVENTION

When a brake pedal is depressed, a pressure-increasing linear control valve is opened by a hydraulic control, whereby operating fluid is flown into a wheel cylinder from an accumulator that serves as a power hydraulic source. In this case, when the pressure-increasing valve is suddenly opened, a hydraulic pulsation occurs, and this hydraulic pulsation is transmitted to pipes to cause abnormal noise. In view of this, in the device proposed in Patent Document 1, an electric current is supplied to the pressure-increasing linear control valve from a current lower than a valve-opening current with a gentle current gradient, upon opening the pressure-increasing valve.

However, once the pressure-increasing valve is opened, it is difficult to keep the pressure-increasing valve slightly opened due to inertia force of the operating fluid supplied from the accumulator. Therefore, when a driver slowly depresses a brake pedal, a detected hydraulic pressure soon reaches a target hydraulic pressure. With this, a target current of the pressure-increasing valve changes in a waveform as illustrated in FIG. 7A, so that the pressure-increasing linear control valve is repeatedly opened and closed. Accordingly, the hydraulic pressure of the wheel cylinder has a stepwise change as illustrated in FIGS. 7B and 7C.

If the stepwise change of the wheel cylinder pressure varies in each wheel, it does not matter so much. However, the stepwise change matches between the left and right wheels, especially between the left and right front wheels that largely contribute to the braking force, as illustrated in FIGS. 7B and 7C, a vehicle deceleration greatly varies as illustrated in FIG. 7D. Therefore, while the driver depresses the brake pedal, the variation in the deceleration continues, which might provide uncomfortable feeling to the driver.

The present invention is accomplished to solve the above problems, and aims to suppress a variation in a vehicle deceleration upon braking.

According to an aspect of the present invention solving the above problems, a vehicle brake control device includes a wheel cylinder (82) provided to each of plural wheels and receiving a hydraulic pressure of operating fluid to apply braking force on the wheels; a power hydraulic source (30) that outputs a high hydraulic pressure even if a brake operation is not performed; a pressure adjusting device (40) that adjusts a hydraulic pressure outputted from the power hydraulic source, and transmits the adjusted hydraulic pressure to each of the wheel cylinders; and a hydraulic control unit (100) that controls the operation of the pressure adjusting device to execute a hydraulic control such that the hydraulic pressure transmitted to the wheel cylinder follows a target hydraulic pressure, the pressure adjusting device including an independent hydraulic control valve (44, 45) of a solenoid type that independently adjusts the hydraulic pressure outputted from the power hydraulic source, and supplies the adjusted hydraulic pressure to the wheel cylinders of the left and right wheels of at least the front wheels or the rear wheels, and the hydraulic control unit controlling the operation of the independent hydraulic control valve to independently control a hydraulic pressure transmitted to the wheel cylinders of the left and right wheels, wherein the vehicle brake control device includes a valve-closing timing matching prevention unit (S32, S33 to S37) that prevents a valve-closing timing of the independent hydraulic control valve (44FL) corresponding to the left wheel of at least the front wheels or the rear wheels and a valve-closing timing of the independent hydraulic control valve (44FR) corresponding to the right wheel of at least the front wheels or the rear wheels from matching, during the hydraulic control by the hydraulic control unit.

In the present invention, the power hydraulic source and plural wheel cylinders are connected via the pressure adjusting device, and the hydraulic control unit controls the operation of the pressure adjusting device to perform the hydraulic control such that the hydraulic pressure transmitted to the wheel cylinder follows the target hydraulic pressure. The pressure adjusting device includes the independent hydraulic control valve of a solenoid type that independently adjusts the hydraulic pressure outputted from the power hydraulic source, and supplies the adjusted hydraulic pressure to the wheel cylinders of the left and right wheels of at least the front wheels or the rear wheels. The hydraulic control unit controls the operation of the independent hydraulic control valve to independently control a hydraulic pressure transmitted to the wheel cylinders of the left and right wheels. A solenoid linear control valve that adjusts a differential pressure between its upstream side and its downstream side according to an applied current may be used for the independent hydraulic control valve, for example.

When a deviation between the hydraulic pressure transmitted to the wheel cylinder and the target hydraulic pressure is small, the independent hydraulic control valve is required to keep slightly opened. However, it is difficult to keep the independent hydraulic control valve of a solenoid type slightly opened. Therefore, the independent hydraulic control valve is repeatedly opened and closed, and with this operation, the hydraulic pressure of the wheel cylinder has a step-wise change. When the waveforms of the change of the wheel cylinders of the left and right wheels match in this case, a variation in a vehicle deceleration sensed by a driver might occur.

In view of this, in the present invention, the valve-closing timing matching prevention unit prevents a valve-closing timing of the independent hydraulic control valve corresponding to the left wheel of at least the front wheels or the rear wheels and a valve-closing timing of the independent hydraulic control valve corresponding to the right wheel of at least the front wheels or the rear wheels from matching, during the hydraulic control by the hydraulic control unit. In other words, the valve-closing timing matching prevention unit prevents a valve-closing timing of the independent hydraulic control valve corresponding to the left wheel and a valve-closing timing of the independent hydraulic control valve corresponding to the right wheel from matching in at least the front wheels or the rear wheels. The hydraulic pressure of the wheel cylinder greatly varies at the moment at which the independent hydraulic control valve is closed. In the present invention, the valve-closing timing matching prevention unit is provided, whereby the timing of the variation in the hydraulic pressure of the wheel cylinder hardly matches between the left wheel and the right wheel. Accordingly, the present invention can reduce the variation in the vehicle deceleration upon braking, thereby being capable of enhancing comfort for a driver.

The pressure adjusting device may include the independent hydraulic control valves only for the wheel cylinders of the left and right front wheels, may include the independent hydraulic control valves only for the wheel cylinders of the left and right rear wheels, or may include the independent hydraulic control valves for the wheel cylinders of the front-left, front-right, rear-left, and rear-right wheels. Even if the pressure adjusting device includes the independent hydraulic control valves for the wheel cylinders of the front-left, front-right, rear-left, and rear-right wheels, the valve-closing timing matching prevention unit may function only to the independent hydraulic control valves that adjust the hydraulic pressure of the wheel cylinders of the left and right front wheels, may function only to the independent hydraulic control valves that adjust the hydraulic pressure of the wheel cylinders of the left and right rear wheels, or may function to the independent hydraulic control valves that adjust the hydraulic pressure of the wheel cylinders of the front-left, front-right, rear-left, and rear-right wheels.

According to another aspect of the present invention, the hydraulic control unit controls energization of the independent hydraulic control valve to increase a current value with a predetermined gradient from a start current lower than a valve-opening current that is a current value upon opening the closed independent hydraulic control valve when a hydraulic adjustment start condition is established, and to decrease the current value when a hydraulic adjustment stop condition is established, and the valve-opening timing matching prevention unit sets different start currents for the independent hydraulic control valve (44FL) corresponding to the left wheel and the independent hydraulic control valve (44FR) corresponding to the right wheel (S22, S32).

In the present invention, when a hydraulic adjustment start condition is established, the hydraulic control unit controls energization of the independent hydraulic control valve to increase a current value with a predetermined gradient from a start current lower than a valve-opening current. The independent hydraulic control valve is opened with the increase in the applied current. Thus, the hydraulic pressure of the wheel cylinder is adjusted. In this case, a value of a current flowing through the independent hydraulic control valve is increased from a start current lower than a valve-opening current with a predetermined gradient, whereby the independent hydraulic control valve can slowly be opened. Accordingly, the hydraulic pulsation that is likely to occur at the moment of opening the valve can be suppressed. After a hydraulic adjustment stop condition is established, the hydraulic control unit controls energization of the independent hydraulic control valve to decrease the current value. With this, the independent hydraulic control valve is closed to stop the flow of the operating fluid. The hydraulic adjustment start condition and the hydraulic adjustment stop condition may be set based on the magnitude of the deviation between a target hydraulic pressure and an actual hydraulic pressure (detected hydraulic pressure) of the wheel cylinder.

When the start current is set small upon controlling the energization of the independent hydraulic control valve, a time from when the current value is started to be increased till the independent hydraulic control valve is opened becomes long, with the result that the time from when the current value is started to be increased till the hydraulic adjustment stop condition is established also becomes long. On the contrary, when the start current is set large, the time from when the current value is started to be increased till the hydraulic adjustment stop condition is established becomes short. The present invention utilizes such situation. Specifically, the valve-closing timing matching prevention unit sets different start currents for the independent hydraulic control valve for the left wheel and for the independent hydraulic control valve for the right wheel to prevent the valve-closing timings of both independent hydraulic control valves from matching. Accordingly, the present invention can reduce the variation in the vehicle deceleration upon braking, thereby being capable of enhancing comfort for a driver.

The valve-closing timing matching prevention unit may include a configuration of setting a different amount (difference between the valve-opening current and the start current) by which the start current becomes smaller than the valve-opening current between the independent hydraulic control valve corresponding to the left wheel and the independent hydraulic control valve corresponding to the right wheel. This configuration can more precisely prevent the valve-closing timings of both independent hydraulic control valves from matching.

According to another aspect of the present invention, the hydraulic control unit controls energization of the independent hydraulic control valve to increase a current value with a predetermined gradient from a start current lower than a valve-opening current that is a current value upon opening the closed independent hydraulic control valve when a hydraulic adjustment start condition is established, and to decrease the current value when a hydraulic adjustment stop condition is established, and the valve-opening timing matching prevention unit sets a different timing at which the current value is increased from the start current between the independent hydraulic control valve (44FL) corresponding to the left wheel and the independent hydraulic control valve (44FR) corresponding to the right wheel (S33 to S36).

When the timing at which the current value is increased from the start current is the same between the left wheel and the right wheel upon controlling the energization of the independent hydraulic control valve, the valve-closing timing is also likely to be the same. In view of this, in the present invention, the valve-closing timing matching prevention unit sets a different timing of increasing the current value from the start current between the independent hydraulic control valve corresponding to the left wheel and the independent hydraulic control valve corresponding to the right wheel to prevent the valve-closing timings of both independent hydraulic control valves from matching. Accordingly, the present invention can reduce the variation in the vehicle deceleration upon braking, thereby being capable of enhancing comfort for a driver.

According to another aspect of the present invention, the valve-closing timing matching prevention unit sets a control inhibiting period in which the hydraulic control for the independent hydraulic control valve corresponding to either one of the left wheel and the right wheel by the hydraulic control unit is inhibited for a set time (t wait) (S35, S36).

According to the present invention, the valve-closing timing matching prevention unit sets a control inhibiting period in which the hydraulic control for the independent hydraulic control valve corresponding to either one of the left wheel and the right wheel is inhibited for a set time. With this, the different timing of increasing the current value from the start current can be set between the independent hydraulic control valve corresponding to the left wheel and the independent hydraulic control valve corresponding to the right wheel. Accordingly, the present invention can prevent the valve-closing timing of the independent hydraulic control valve corresponding to the left wheel and the valve-closing timing of the independent hydraulic control valve corresponding to the right wheel from matching. As a result, the present invention can reduce the variation in the vehicle deceleration upon braking, thereby being capable of enhancing comfort for a driver.

According to another aspect of the present invention, the valve-closing timing matching prevention unit does not set the control inhibiting period upon initial braking in which the hydraulic control unit performs the hydraulic control first after a brake operation (S33).

When the control inhibiting period is set, the difference in braking force between the left wheel and the right wheel occurs during this period. According to the present invention, the control inhibiting period is not set upon initial braking in which the hydraulic control unit performs the hydraulic control first after a brake operation. This configuration can prevent the vehicle deflection, and can prevent the driver from having uncomfortable feeling.

According to another aspect of the present invention, the vehicle brake control device further includes: an operation speed detection unit (100, 101) that detects a brake operation speed; and an operation speed response unit (S14) that allows the operation of the valve-closing timing matching prevention unit based on the brake operation speed when the brake operation speed is not more than a set speed, and inhibits the operation of the valve-closing timing matching prevention unit based on the brake operation speed when the brake operation speed exceeds the set speed.

When a driver slowly depresses the brake pedal, the independent hydraulic control valve is difficult to keep slightly opened. Therefore, the independent hydraulic control valve is likely to be repeatedly opened and closed. Accordingly, the hydraulic pressure of the wheel cylinder has a stepwise change. On the other hand, when the driver sharply depresses the brake pedal, the deviation between the hydraulic pressure supplied to the wheel cylinder and the target hydraulic pressure is large, so that the independent hydraulic control valve keeps opened due to the hydraulic control. In this case, the hydraulic pressure of the wheel cylinder is hardly changed in a stepwise manner.

In view of this, in the present invention, the operation speed detection unit detects a brake operation speed, and when the brake operation speed is not more than a set speed, the operation speed response unit allows the operation of the valve-closing timing matching prevention unit, and inhibits the operation of the valve-closing timing matching prevention unit when the brake operation speed exceeds the set speed. With this configuration, the valve-closing timing matching prevention unit can be operated under an appropriate condition, whereby the difference in braking force between the left wheel and the right wheel is not unnecessarily generated.

In the above description, the reference numerals used in the embodiments are added in parentheses to the respective corresponding components in the embodiments, in order to facilitate understanding of the present invention. However, the respective constituents of the present invention are not intended to be limited to the components specified by the reference numerals in the embodiments.

BRIEF DESCRIPTION OF THE DRAWINGS

FIG. 2A illustrates a basic hydraulic control routine for a front-left wheel, and FIG. 2B illustrates a basic hydraulic control routine for a front-right wheel according to an embodiment.

BEST MODE FOR CARRYING OUT THE INVENTION

Figure 1:
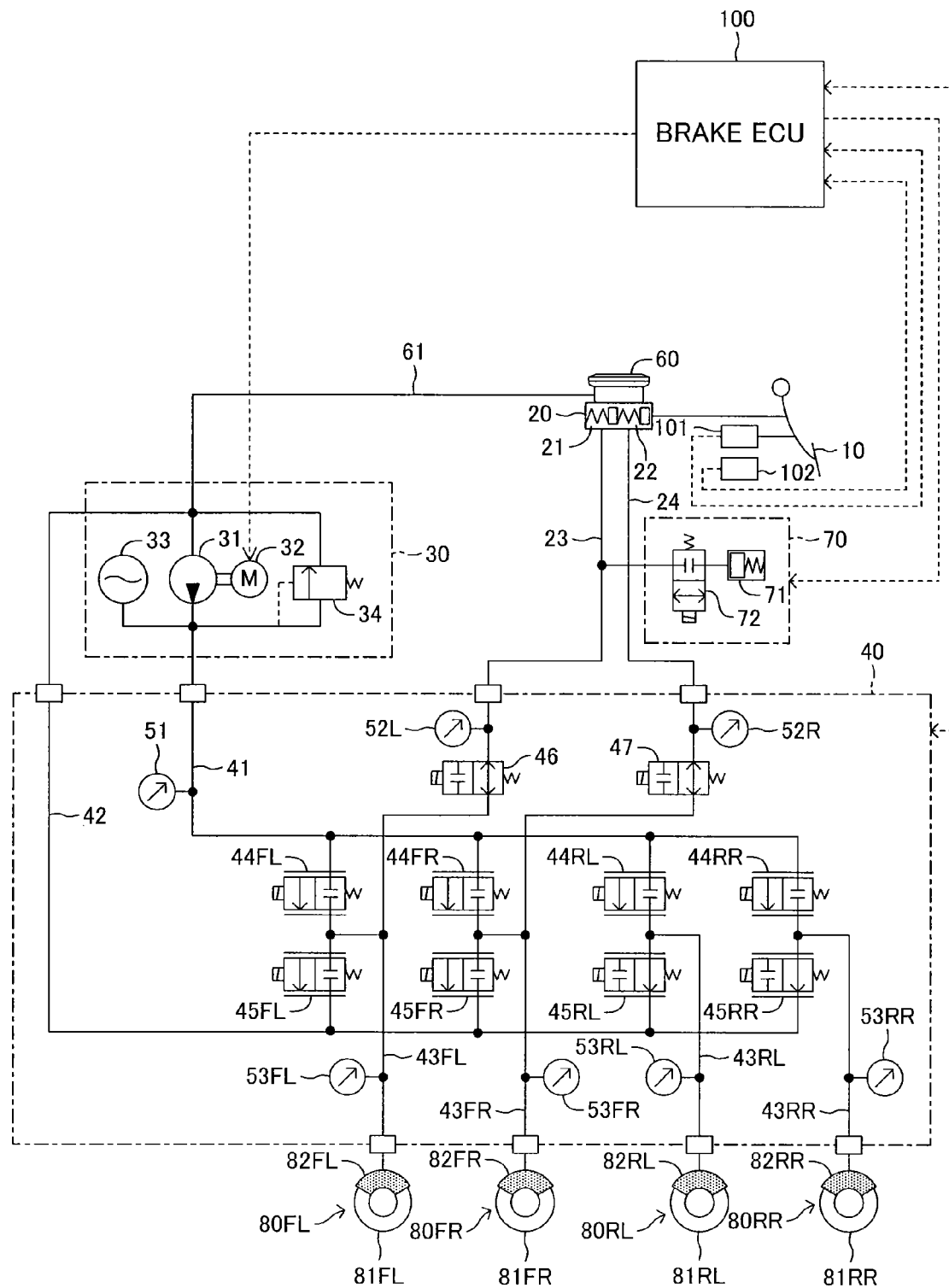
FIG. 1 is a diagram illustrating a schematic system configuration of a vehicle brake control device according to an embodiment of the present invention.

A vehicle brake control device according to one embodiment of the present invention will be described below with reference to the accompanying drawings. FIG. 1 is a diagram illustrating a schematic system configuration of a vehicle brake control device according to the embodiment of the present invention.

The brake control device according to the present embodiment includes a brake pedal 10, a master cylinder 20, a power hydraulic pressure generating device 30, a brake actuator 40, a reservoir 60, a stroke simulator device 70, disk brake units 80FL, 80FR, 80RL, and 80RR, each of which is provided to each wheel, and a brake ECU 100 serving as an electronic control device performing a brake control.

The disk brake units 80FL, 80FR, 80RL, and 80RR respectively include brake disks 81FL, 81FR, 81RL, and 81RR, and wheel cylinders 82FL, 82FR, 82RL, and 82RR incorporated in brake calipers. The wheel cylinders 82FL, 82FR, 82RL, and 82RR are connected to the brake actuator 40, and they press a brake pad against the brake disks 81FL, 81FR, 81RL, and 81RR, which rotate with wheels, by hydraulic pressure of the operating fluid (brake fluid) supplied from the brake actuator 40 to apply braking force to the wheels.

The master cylinder 20 includes two pressure chambers 21 and 22. The pressure chambers 21 and 22 are connected to the wheel cylinders 82FL and 82FR for the front wheels by master passages 23 and 24. When the brake pedal 10 is depressed, a pressure piston advances forward to increase the pressure of the operating fluid, and the master cylinder 20 transmits the increased hydraulic pressure (master cylinder pressure) to the wheel cylinders 82FL and 82FR. The reservoir 60 storing the operating fluid with the atmospheric pressure is provided on the master cylinder 20. The pressure chambers 21 and 22 in the master cylinder 20 are respectively connected to the reservoir 60. The master cylinder 20 is configured to allow the flow of the operating fluid from the reservoir 60 to the pressure chambers 21 and 22 when the pressure piston moves backward, while it is configured to inhibit the flow of the operating fluid in the opposite direction when the pressure piston moves forward.

The stroke simulator device 70 is connected to the pressure chamber 21 in the master cylinder 20. The stroke simulator device 70 includes a stroke simulator 71 and a simulator cut valve 72. The simulator cut valve 72 is a normally closed solenoid valve that keeps closed by biasing force of a spring when a solenoid is not energized, but is opened only when the solenoid is energized. When the simulator cut valve 72 is closed, the flow of the operating fluid between the master passage 23 and the stroke simulator 71 is cut off. When the simulator cut valve 72 is opened, the flow of the operating fluid between the master passage 23 and the stroke simulator 71 is allowed in both directions.

The stroke simulator 71 includes plural pistons and springs. When the simulator cut valve 72 is opened, the stroke simulator 71 takes inside the operating fluid in an amount according to a brake operation amount to enable a stroke operation of the brake pedal 10, and generates reaction force according to a pedal operation amount to allow a driver to feel a satisfactory brake operation sense.

The power hydraulic pressure generating device 30 is a power hydraulic source, and includes a pump 31 that sucks operating fluid from the reservoir 60 via an intake passage 61, a motor 32 that drives the pump 31, an accumulator 33, and a relief valve 34. The accumulator 33 converts pressure energy of the operating fluid pressurized by the pump 31 into pressure energy of sealed gas such as nitrogen, and stores the resultant energy. The relief valve 34 is opened to return the operating fluid to the reservoir 60, when the pressure of the operating fluid abnormally increases. The power hydraulic pressure generating device 30 is connected to the brake actuator 40 to supply the pressurized operating fluid to the brake actuator 40.

The brake actuator 40 includes an accumulator passage 41 into which the pressurized operating fluid is supplied from the power hydraulic pressure generating device 30, a return passage 42 connected to the intake passage 61, and four individual passages 43FL, 43FR, 43RL, and 43RR connected to each of the wheel cylinders 82FL, 82FR, 82RL, and 82RR. The brake actuator 40 also includes pressure-increasing linear control valves 44FL, 44FR, 44RL, and 44RR, and connects the individual passages 43FL, 43FR, 43RL, and 43RR to the accumulator passage 41 via the pressure-increasing linear control valves 44FL, 44FR, 44RL, and 44RR. The brake actuator 40 also includes pressure-decreasing linear control valves 45FL, 45FR, 45RL, and 45RR, and connects the individual passages 43FL, 43FR, 43RL, and 43RR to the return passage 42 via the pressure-decreasing linear control valves 45FL, 45FR, 45RL, and 45RR.

The components provided for each wheel are represented such that FL for the front-left wheel, FR for the front-right wheel, RL for the rear-left wheel, and RR for the rear-right wheel are written at the end of the corresponding reference numeral. However, the reference symbols at the end are omitted, when it is unnecessary to specify any one of the components for the front-left, front-right, rear-left, and rear-right wheels.

Figure 8:
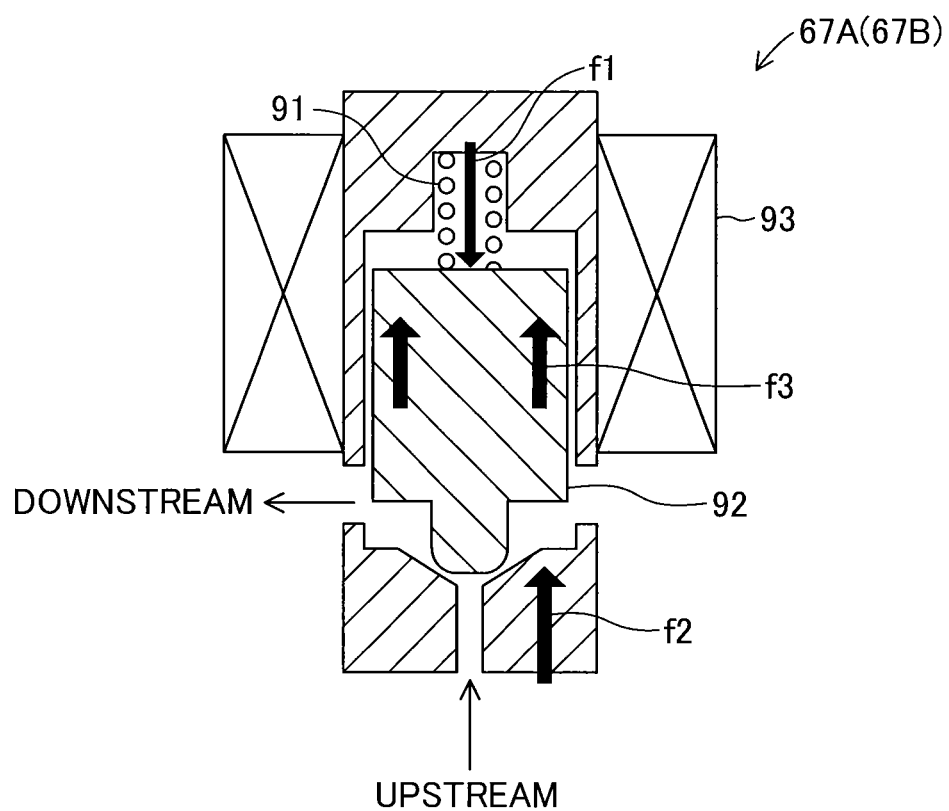
FIG. 8 is diagram illustrating an operating principle of a normally closed solenoid linear control valve.

The pressure-increasing linear control valve 44 and the pressure-decreasing linear control valve 45 are solenoid linear control valves. The operating principle of the solenoid linear control valve will be described by using a normally closed solenoid linear control valve as an example. As illustrated in FIG. 8, the normally closed solenoid linear control valve keeps closed by valve closing force (f1−f2) that is a difference between spring reaction force f1 of a spring 91 for biasing a valve element (plunger) 92 in the valve closing direction and hydraulic pressure force f2 that biases the valve element 92 in the valve opening direction due to differential pressure ΔP between a pressure at an upstream side (inlet side) and a pressure at a downstream side (outlet side). When electromagnetic force f3 generated by an application of an electric current to a solenoid 93 for opening the valve element 92 exceeds the valve closing force, the valve is opened with an opening degree according to balance of force exerted on the valve element 93. Accordingly, the opening degree of the valve element 92 is adjusted by controlling the amount of current applied to the solenoid 93 (current value), whereby the hydraulic pressure at the downstream side of the linear control valve can continuously be changed.

In the present embodiment, a normally closed solenoid linear control valve is used for the pressure-increasing linear control valves 44FL, 44FR, 44RL, and 44RR, and the pressure-decreasing linear control valves 45FL and 45FR for the front wheels, while a normally opened solenoid linear control valve is used for the pressure-decreasing linear control valves 45RL and 45RR for the rear wheels. With this, the pressure-increasing linear control valves 44FL, 44FR, 44RL, and 44RR are closed when current is not applied to the solenoid, and when current is applied to the solenoid, these valves are opened with an opening degree according to the amount of current applied to the solenoid, thereby allowing the inflow of the operating fluid into the wheel cylinders 82FL, 82FR, 82RL, and 82RR from the power hydraulic pressure generating device 30 to increase the wheel cylinder pressure. The pressure-decreasing linear control valves 45FL and 45FR for the front wheels are closed when current is not applied to the solenoid, and when current is applied to the solenoid, these valves are opened with an opening degree according to the amount of current applied to the solenoid, thereby allowing the outflow of the operating fluid to the reservoir 60 from the wheel cylinders 82FL and 82FR to decrease the wheel cylinder pressure. The pressure-decreasing linear control valves 45RL and 45RR for the rear wheels are opened when current is not applied to the solenoid, thereby allowing the outflow of the operating fluid to the reservoir 60 from the wheel cylinders 82RL and 82RR to decrease the wheel cylinder pressure. However, when current is applied to the solenoid, these valves are closed to inhibit the outflow of the operating fluid to the reservoir 60 from the wheel cylinders 82RL and 82RR. In this case, when the amount of current applied to the solenoid is small, the valve elements in the pressure-decreasing linear control valves 45RL and 45RR do not move up to the valve closing position, so that these valves are adjusted to have an opening degree according to the amount of the applied current.

Accordingly, an execution of an energization control of the pressure-increasing linear control valve 44 and the pressure-decreasing linear control valve 45 can switch among a state in which the inflow of the operating fluid to the wheel cylinder 82 from the power hydraulic pressure generating device 30 is allowed, a state in which the outflow of the operating fluid from the wheel cylinder 82 to the reservoir 60 is allowed, and a state in which neither the inflow of the operating fluid to the wheel cylinder 82 from the power hydraulic pressure generating device 30 nor the outflow of the operating fluid from the wheel cylinder 82 to the reservoir 60 is allowed. With this, the wheel cylinder pressure of each wheel can independently be controlled to target hydraulic pressure.

The brake actuator 40 includes master cut valves 46 and 47. The brake actuator 40 connects the master passage 23 and the individual passage 43FL via the master cut valve 46, and connects the master passage 24 and the individual passage 43FR via the other master cut valve 47. Both of two master cut valves 46 and 47 are a normally opened solenoid valve that keeps opened due to biasing force of a spring when a solenoid is not energized, and that is closed only when the solenoid is energized. When the master cut valve 46 is closed, the flow of the operating fluid between the pressure chamber 21 in the master cylinder 20 and the wheel cylinder 82FL is cut off, and when the master cut valve 46 is opened, the bidirectional flow of the operating fluid between the pressure chamber 21 in the master cylinder 20 and the wheel cylinder 82FL is allowed. Similarly, when the master cut valve 47 is closed, the flow of the operating fluid between the pressure chamber 22 in the master cylinder 20 and the wheel cylinder 82FR is cut off, and when the master cut valve 47 is opened, the bidirectional flow of the operating fluid between the pressure chamber 22 in the master cylinder 20 and the wheel cylinder 82FR is allowed.

The brake actuator 40 also includes an accumulator pressure sensor 51, master cylinder pressure sensors 52L and 52R, and wheel cylinder pressure sensors 53FL, 53FR, 53RL, and 53RR. The accumulator pressure sensor 51 is provided on the accumulator passage 41 that is a passage between the power hydraulic pressure generating device 30 and each pressure-increasing linear control valve 44 to detect an accumulator pressure Pacc that is a hydraulic pressure outputted from the power hydraulic pressure generating device 30. The master cylinder pressure sensors 52L and 52R are provided on the master passages 23 and 24 between the pressure chambers 21 and 22 in the master cylinder 20 and the master cut valves 46 and 47 to detect a hydraulic pressure of the operating fluid pressurized in the pressure chambers 21 and 22. The hydraulic pressure detected by the master cylinder pressure sensors 52L and 52R are referred to as master cylinder pressures PmL and PmR.

Each of the wheel cylinder pressure sensors 53FL, 53FR, 53RL, and 53RR are provided to each of the individual passages 43FL, 43FR, 43RL, and 43RR to detect a hydraulic pressure of each of wheel cylinders 82FL, 82FR, 82RL, and 82RR. The hydraulic pressures detected by the wheel cylinder pressure sensors 53FL, 53FR, 53RL, and 53RR are referred to as wheel cylinder pressures PwFL, PwFR, PwRL, and PwRR. The wheel cylinder pressure sensors 53FL, 53FR, 53RL, and 53RR and the wheel cylinder pressures PwFL, PwFR, PwRL, and PwRR are merely referred to as a wheel cylinder pressure sensor 53 and a wheel cylinder pressure Pw, when it is unnecessary to specify any one of them for front-left, front-right, rear-left, and rear-right wheels.

The power hydraulic pressure generating device 30, the brake actuator 40, and the stroke simulator device 70 are controlled to be driven by the brake ECU 100. The brake ECU 100 includes a microcomputer as a main component, and also includes, for example, a pump drive circuit, a solenoid valve drive circuit, an input interface receiving signals from various sensors, and a communication interface. Four pressure-increasing linear control valves 44, four pressure-decreasing linear control valves 45, the master cut valves 46 and 47, and the simulator cut valve 72 are connected to the brake ECU 100. The brake ECU 100 outputs a solenoid drive signal to these valves to control to open or close each valve and to control the opening degree (in the case of the linear control valve) of each valve. The motor 32 provided to the power hydraulic pressure generating device 30 is also connected to the brake ECU 100, and the brake ECU 100 outputs a drive signal to the motor 32 to control to drive the motor 32.

The accumulator pressure sensor 51, the master cylinder pressure sensors 52R and 52L, and the wheel cylinder pressure sensors 53FR, 53FL, 53RR, and 53RL are connected to the brake ECU 100, whereby the brake ECU 100 receives signals indicating the accumulator pressure Pacc, the master cylinder pressures PmL and PmR, and the wheel cylinder pressures PwFR, PwFL, PwRR, and PwRL.

A pedal stroke sensor 101 and a pedal switch 102 are also connected to the brake ECU 100. The pedal stroke sensor 101 is a type of a pedal operation detecting device, and it detects a pedal stroke that is a depression amount of the brake pedal 10 and outputs a signal indicating the detected pedal stroke Sp to the brake ECU 100. The pedal switch 102 is turned on upon the depression of the brake pedal 10 up to a set position to turn on a stop lamp not illustrated. The pedal switch 102 outputs a signal (pedal switch signal) indicating a state of the switch to the brake ECU 100.

Next, a brake control executed by the brake ECU 100 will be described. In the present embodiment, at least two control modes, which are a linear control mode and a backup mode, are set. The brake ECU 100 selects the linear control mode in a normal state in which no abnormality is detected for an electric system and a control system, while selects the backup mode in the case where something abnormal is detected for the electric system and the control system.

A vehicle including the brake control device according to the present invention is a hybrid vehicle having a motor driven by a battery power source and an internal combustion engine driven by gasoline fuel. The hybrid vehicle performs a regenerative braking control in which rotating force of wheels generates electric power from a motor, and the generated electric power is collected to a battery to acquire braking force. In such regenerative braking control, the brake control device generates braking force excluding the braking force generated by regeneration from the total braking force necessary for stopping the vehicle. With this control, a brake regenerative cooperation control using both regenerative braking and hydraulic braking can be performed.

The brake regenerative cooperation control is executed in the linear control mode. In the linear control mode, a pedal effort obtained by the driver's depressing operation of the brake pedal 10 is used only for detecting the brake operation amount without being transmitted to the wheel cylinder 82. Instead, the hydraulic pressure outputted from the power hydraulic pressure generating device 30 is transmitted to the wheel cylinder 82 after being individually adjusted by the pressure-increasing linear control valve 44 and the pressure-decreasing linear control valve 45 for each wheel. On the other hand, in the backup mode, the hydraulic pressure increased by the brake pedal effort is transmitted to the wheel cylinder 82. The brake ECU 100 switches the linear control mode and the backup mode by changing a flow path through which the operating fluid flows by the brake actuator 40. Notably, the execution of the brake regenerative cooperation control is not always necessary in the linear control mode.

In the linear control mode, the master cut valves 46 and 47 are kept closed due to the energization of the solenoid. The simulator cut valve 72 is kept opened due to the energization of the solenoid. All of the pressure-increasing linear control valves 44 and the pressure-decreasing linear control valves 45 are under the energization control state to be controlled to have an opening degree according to an energization amount. With this, the hydraulic pressure outputted from the master cylinder 20 is not supplied to the wheel cylinder 82 of each wheel, but the hydraulic pressure outputted from the power hydraulic pressure generating device 30 is supplied thereto after individually adjusted.

The brake ECU 100 starts the brake regenerative cooperation control in response to a brake request. The brake request is generated when braking force has to be applied to the vehicle, e.g., when a driver depresses the brake pedal 10. When receiving the brake request, the brake ECU 100 calculates requested braking force based on the pedal stroke Sp detected by the pedal stroke sensor 101 and the master cylinder pressures PmL and PmR detected by the master cylinder pressure sensors 52L and 52R. In this case, the brake ECU 100 sets either one of the master cylinder pressures PmL and PmR or a value (e.g., an average) formed by combining both pressures as a master cylinder pressure Pm.

The requested braking force is set larger, as the pedal stroke Sp is larger, or as the master cylinder pressure Pm is larger. In this case, weighting coefficients Ks and Kr are multiplied respectively to the pedal stroke Sp and the master cylinder pressure Pm. The requested braking force may be calculated by setting the weighting coefficient Ks for the pedal stroke Sp to be large within the range where the pedal stroke Sp is small, or by setting the weighting coefficient Kr for the master cylinder pressure Pm to be large within the range where the pedal stroke Sp is large.

The brake ECU 100 transmits information indicating the calculated requested braking force to a hybrid ECU. The hybrid ECU calculates braking force generated due to power regeneration in the requested braking force, and transmits information indicating the regenerative braking force, which is the result of the calculation, to the brake ECU 100. With this process, the brake ECU 100 calculates requested hydraulic braking force, which is braking force that should be generated by the brake control device, by subtracting the regenerative braking force from the requested braking force. The regenerative braking force generated due to the power regeneration by the hybrid ECU changes not only by the rotating speed of the motor, but also by a regenerative current control due to a state of charge (SOC) of a battery, for example. Accordingly, the brake ECU 100 can calculate appropriate requested hydraulic braking force by subtracting the regenerative braking force from the requested braking force.

The brake ECU 100 calculates a target hydraulic pressure of each wheel cylinder 82 based on the calculated requested hydraulic braking force, and controls a drive current of the pressure-increasing linear control valve 44 and the pressure-decreasing linear control valve 45 by a feedback control so as to cause the wheel cylinder pressure to be equal to the target hydraulic pressure. Specifically, the brake ECU 100 controls a current flowing through the pressure-increasing linear control valve 44 and the pressure-decreasing linear control valve 45 in order that the wheel cylinder pressure Pw detected by the wheel cylinder pressure sensor 53 for each wheel follows the target hydraulic pressure.

With this process, the operating fluid is supplied to the wheel cylinder 82 from the power hydraulic pressure generating device 30 via the pressure-increasing linear control valve 44, whereby braking force is applied to the wheels. In addition, the operating fluid is discharged from the wheel cylinder 82 via the pressure-decreasing linear control valve 45 as necessary, whereby the braking force applied to the wheels is adjusted.

During the normal brake control, the same target hydraulic pressure is set for four wheels. However, when a vehicle behavior control such as a turning control is performed, a different target hydraulic pressure is set for each wheel, and the pressure-increasing linear control valve 44 and the pressure-decreasing linear control valve 45 are controlled in order that the wheel cylinder pressure Pw detected by the wheel cylinder pressure sensor 53 for each wheel follows the corresponding target hydraulic pressure.

The brake ECU 100 stores valve-opening current characteristics of each of the pressure-increasing linear control valves 44 and each of the pressure-decreasing linear control valves 45 for controlling the energization of the pressure-increasing linear control valves 44 and the pressure-decreasing linear control valves 45. A solenoid linear control valve has a certain relationship between a differential pressure $\Delta P$, which is a difference between an upstream-side hydraulic pressure (inlet-side hydraulic pressure) and a downstream-side hydraulic pressure (outlet-side hydraulic pressure), and a valve-opening current. In a normally closed solenoid linear control valve, the valve-opening current means a current value at the time when a valve element that is closed starts to be opened due to an increase in a current flowing through a solenoid. In a normally opened solenoid linear control valve, the valve-opening current means a current value at the time when a valve element that is closed starts to be opened due to a decrease in a current flowing through a solenoid. The valve-opening current characteristic represents a correlation between the valve-opening current and the differential pressure $\Delta P$. The normally closed solenoid linear control valve has the valve-opening current characteristic in which, the larger the differential pressure $\Delta P$ becomes, the smaller the valve-opening current becomes according to a linear function. The normally opened solenoid linear control valve has the valve-opening current characteristic in which, the larger the differential pressure $\Delta P$ becomes, the larger the valve-opening current becomes according to a linear function.

When controlling the energization of the pressure-increasing linear control valve 44 and the pressure-decreasing linear control valve 45, the brake ECU 100 obtains a valve-opening current i open corresponding to the differential pressure $\Delta P$ between the upstream-side hydraulic pressure and the downstream-side hydraulic pressure of the linear control valve by referring to the valve-opening current characteristic, and sets a target current i* applied to the linear control valve by using the valve-opening current i open as a reference. For example, the target current i* is calculated by adding a value, which is obtained by multiplying a deviation between the target hydraulic pressure P* and the wheel cylinder pressure Pw by a feedback gain Gfb, to the valve-opening current i open (i*=i open+Gfb·(P*−Pw)). When the deviation (P*−Pw) is positive, the pressure-increasing linear control valve 44 is opened with an opening degree according to the deviation to increase the wheel cylinder pressure. When the deviation (P*−Pw) is negative, a feedback control term is calculated by using the absolute value of the deviation, and the pressure-decreasing linear control valve 45 is opened with an opening degree according to the absolute value of the deviation to decrease the wheel cylinder pressure.

When the accumulator pressure Pacc detected by the accumulator pressure sensor 51 is less than a minimum set pressure set beforehand, the brake ECU 100 drives the motor 32 to increase the pressure of the operating fluid by the pump 31 so as to control the accumulator pressure Pacc to always fall within the set pressure range.

The brake ECU 100 also keeps the simulator cut valve 72 opened. With this, the operating fluid sent from the pressure chamber 21 in the master cylinder 20 is supplied to the stroke simulator 71 with the driver's pedal operation for the brake pedal 10. Thus, the brake ECU 100 can exert reaction force according to the driver's pedal effort to the brake pedal 10, thereby being capable of providing satisfactory pedal operation feeling to the driver.

Subsequently, the backup mode will be described. In the backup mode, energization of all solenoid on-off valves and solenoid linear control valves provided to the brake actuator 40 is stopped. Therefore, the master cut valves 46 and 47 and the pressure-decreasing linear control valves 45RL and 45RR for the rear wheels, which are the normally opened solenoid valves, are kepd opened. The normally closed solenoid valves, i.e., the simulator cut valve 72, the four pressure-increasing linear control valves 44, and the pressure-decreasing linear control valves 45FL and 45FR for the front wheels, are kept closed. The energization of the power hydraulic pressure generating device 30 is also stopped.

Accordingly, in the backup mode, the communication between the power hydraulic pressure generating device 30 and each wheel cylinder 82 is cut off, but a front-left wheel pedal force hydraulic circuit that communicates the pressure chamber 21 in the master cylinder 20 and the wheel cylinder 82FL for the front-left wheel and a front-right wheel pedal force hydraulic circuit that communicates the pressure chamber 22 in the master cylinder 20 and the wheel cylinder 82FR for the front-right wheel are independently formed. Accordingly, the master cylinder pressure generated by the driver's pedal effort is independently transmitted to the wheel cylinder 82FL for the front-left wheel and the wheel cylinder 82FR for the front-right wheel.

<First Embodiment According to Deceleration Variation Prevention Control>

Subsequently, a deceleration variation prevention control will be described. The deceleration variation prevention control is executed when the target hydraulic pressure of the wheel cylinders 82 for the left and right wheels are the same.

Figure 7A:
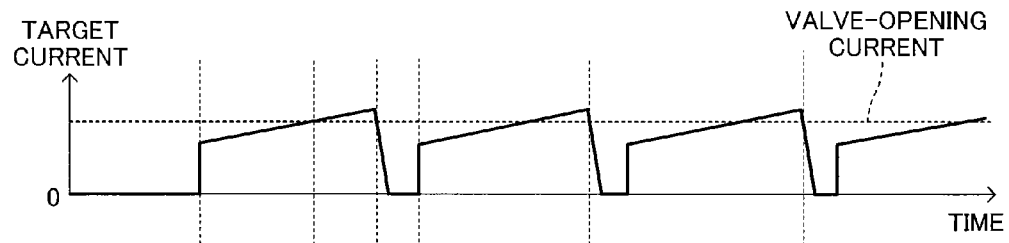
FIGS. 7A-7D are graphs illustrating a change in a target current, a wheel cylinder pressure, and a vehicle deceleration in a background art.

When the brake pedal 10 is depressed, the pressure-increasing linear control valve 44 is opened to supply the operating fluid to the wheel cylinder 82 from the power hydraulic pressure generating device 30. When the pressure-increasing linear control valve 44 is sharply opened, pulsation of the hydraulic pressure of the operating fluid occurs to generate abnormal noise in a pipe. Such problem can be solved by slowly opening the pressure-increasing linear control valve 44 with a gradual increase in the value of the current flowing through the pressure-increasing linear control valve 44 from a value smaller than the valve-opening current. This energization control is referred to as a hydraulic pulsation prevention control. However, since high-pressure operating fluid supplied from the accumulator 33 passes through the pressure-increasing linear control valve 44, the pressure-increasing linear control valve 44 is difficult to keep a small opening degree due to inertia of the operating fluid. Therefore, when the brake pedal 10 is slowly depressed, the wheel cylinder pressure cannot slowly be increased toward the target hydraulic pressure, resulting in that the detected wheel cylinder pressure Pw soon reaches the target hydraulic pressure. Accordingly, the target current of the pressure-increasing linear control valve 44 changes with a waveform as illustrated in FIG. 7A, so that the pressure-increasing linear control valve 44 is repeatedly opened and closed. With this operation, the wheel cylinder pressure has a stepwise change.

Figure 7B:
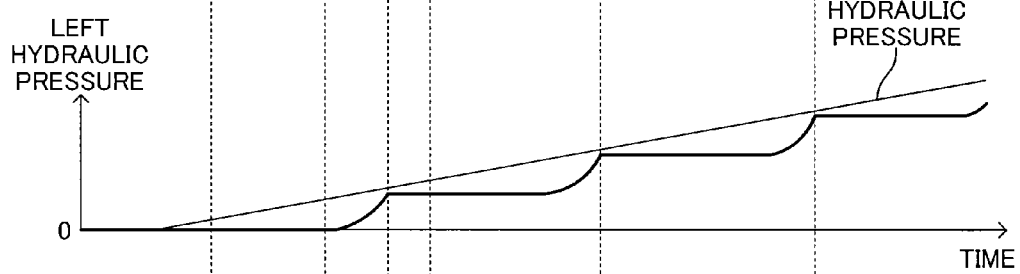
Figure 7C:
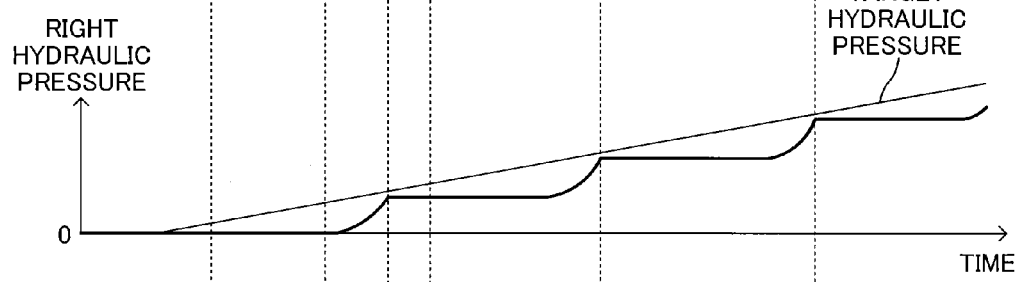
Figure 7D:
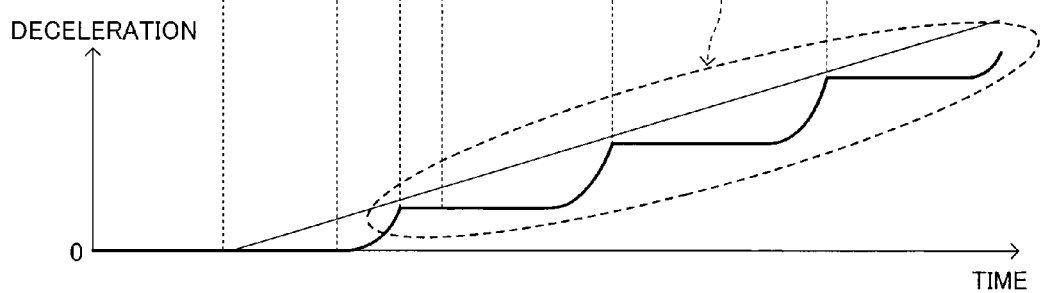

Since the same target hydraulic pressure is set for the wheel cylinders 82 for four wheels in the normal hydraulic control, the stepwise change of the wheel cylinder pressure sometimes matches (is synchronized) between the left wheels and the right wheels as illustrated in FIGS. 7B and 7C. Especially when the stepwise change of the wheel cylinder pressure is the same for the front-left wheel and the front-right wheel, which largely contribute to the braking force, the deceleration of the vehicle might change in a stepwise manner with a large amplitude as illustrated in FIG. 7D, and this deceleration might provide uncomfortable feeling to the driver. In view of this, the brake ECU 100 executes the deceleration variation prevention control. In the present embodiment, a different hydraulic pulsation prevention control for preventing the pulsation of the wheel cylinder pressure is executed for each of the front-left wheel and the front-right wheel to perform the deceleration variation prevention control.

FIG. 2 is a basic hydraulic control routine executed by the microcomputer in the brake ECU 100. FIG. 2A illustrates the basic hydraulic control routine for the front-left wheel, and FIG. 2B illustrates the basic hydraulic control routine for the front-right wheel. The basic hydraulic control routine for the front-left wheel and the basic hydraulic control routine for the front-right wheel are repeatedly performed in parallel at a predetermined operation cycle.

The detail of the hydraulic pulsation prevention control (step S20, step S30) is different, but the other processes are basically the same between the basic hydraulic control routine for the front-left wheel and the basic hydraulic control routine for the front-right wheel, except that the wheel cylinder pressure that is the subject to be controlled is for the front-left wheel or for the front-right wheel. Therefore, the processes that are the same between the left wheel and the right wheel are identified by the same step numbers in FIG. 2, and the description of the basic hydraulic control routine for the front-left wheel is also applied to the basic hydraulic control routine for the front-right wheel. Notably, this basic hydraulic control routine represents the process of opening the pressure-increasing linear control valve 44 to increase the wheel cylinder pressure by the depressing operation for the brake pedal 10.

The basic hydraulic control routine for the front-left wheel will be described. The basic hydraulic control routine is started when an ignition switch is turned on. In step S11, the brake ECU 100 determines whether or not the brake request is issued or not. In this case, the brake ECU 100 determines whether the brake request is issued or not based on whether or not the pedal stroke Sp detected by the pedal stroke sensor 101 is larger than a brake determination threshold value. When the brake request is not issued, i.e., when the brake pedal 10 is not depressed, the brake ECU 100 sets a target current iFL* of the pressure-increasing linear control valve 44FL to zero in step S12 (iFL*=0).

The brake ECU 100 repeats such process. When determining that the brake request is issued (S11: Yes), the brake ECU 100 calculates the deviation E (=P*−PwFL) between the target hydraulic pressure P* and the wheel cylinder pressure PwFL detected by the wheel cylinder pressure sensor 53FL, and determines whether or not the deviation E is equal to or larger than a threshold value Eref in step S13. Two types of the threshold value Eref, that is, a threshold value Eref1 for starting to increase the pressure and a threshold value Eref2 (<Eref1) for stopping the increase in the pressure, are set. When the increase in pressure is not started, the threshold value Eref1 is selected, and during the increase in pressure, the threshold value Eref2 is selected. This step S13 corresponds to a process of determining whether a hydraulic adjustment start condition and a hydraulic adjustment stop condition are established or not according to the present invention.

When the deviation E is smaller than the threshold value Eref, the brake ECU 100 proceeds to step S12 to set the target current iFL* of the pressure-increasing control valve 44FL to zero. On the other hand, when the deviation E is equal to or larger than the threshold value Eref, the brake ECU 100 calculates a depressing speed Vp of the brake pedal 10, and determines whether or not the depressing speed Vp is equal to or smaller than a threshold value Vpref in step S14. The depressing speed Vp can be obtained by calculating an amount of change (derivative value) of the pedal stroke Sp, detected by the pedal stroke sensor 101, per a unit time. The threshold value Vpref is a threshold value for determining whether the brake pedal 10 is slowly depressed or not.

When determining that the depressing speed Vp exceeds the threshold value Vpref in step S14, the brake ECU 100 calculates the target current iFL* of the pressure-increasing linear control valve 44 by the feedback control in step S15. In this case, the brake ECU 100 sets the valve-opening current i open to the differential pressure ΔP between the upstream side and the downstream side of the pressure-increasing linear control valve 44FL by referring to the valve-opening current characteristic of the pressure-increasing linear control valve 44FL, and calculates the target current iFL* from the equation (1) described below.

$$iFL^* = i\text{ open} + Gfb \cdot E \quad (1)$$

Here, Gfb is a feedback control gain, and E is a deviation (P*−PwFL) between the target hydraulic pressure P* and the wheel cylinder pressure PwFL. The differential pressure ΔP for setting the valve-opening current i open is obtained by calculating the difference between the accumulator pressure Pacc detected by the accumulator pressure sensor 51 and the wheel cylinder pressure PwFL detected by the wheel cylinder pressure sensor 53FL. The brake ECU 100 applies the target current iFL* thus calculated to the solenoid of the pressure-increasing linear control valve 44FL.

When determining that the depressing speed Vp is equal to or smaller than the threshold value Vpref in step S14, the brake ECU 100 executes the hydraulic pulsation prevention control in step S20 (step S30 in the basic hydraulic control routine for the front-right wheel).

Figure 3B:
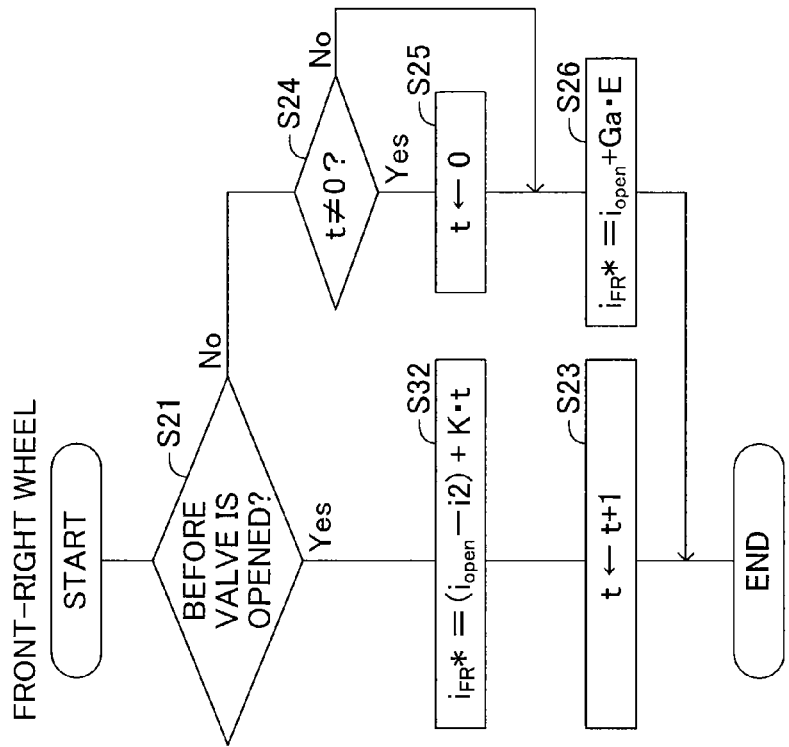
FIG. 3B illustrates a hydraulic pulsation prevention control subroutine for a front-right wheel according to a first embodiment.
Figure 3A:
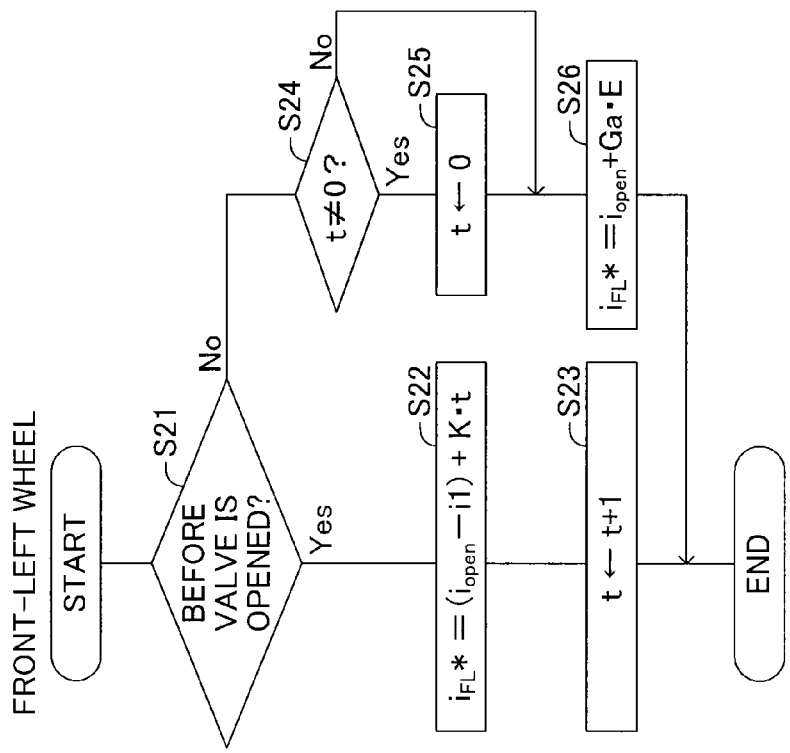
FIG. 3A illustrates a hydraulic pulsation prevention control subroutine for a front-left wheel.

FIG. 3 illustrates a hydraulic pulsation prevention control subroutine. FIG. 3A illustrates a hydraulic pulsation prevention control subroutine (S20) for the front-left wheel, and FIG. 3B illustrates a hydraulic pulsation prevention control subroutine (S30) for the front-right wheel. The hydraulic pulsation prevention control subroutine for the front-left wheel will firstly be described.

When the hydraulic pulsation prevention control subroutine for the front-left wheel is started, the brake ECU 100 determines in step S21 whether or not it is before the pressure-increasing linear control valve 44 is opened. The pressure-increasing linear control valve 44FL is energized such that a current is increased from a value lower than the valve-opening current. Therefore, just after the hydraulic pulsation prevention control subroutine is started, the brake ECU 100 makes "Yes" determination. In following step S22, the brake ECU 100 calculates the target current i* of the pressure-increasing linear control valve 44FL from the equation (2) described below.

$$iFL^* = (i\text{ open} - i1) + K \cdot t \quad (2)$$

In this equation, i1 is a decrease set value set beforehand, and it is a value for setting an amount that is a difference between the valve-opening current and a current value, which is smaller than the valve-opening current, upon starting the energization of the pressure-increasing linear control valve 44FL (an amount of determining how much smaller than the valve-opening current the current to the pressure-increasing linear control valve 44FL is). t is a timer value corresponding to an elapsed time, and its initial value is set to zero. K is an increase coefficient for setting an increasing gradient of the target current iFL*. Therefore, when the hydraulic pulsation prevention control subroutine is executed first, the target current iFL* is set to a current value (i open−i1) smaller than the valve-opening current by a decrease set value i1. This current value (i open−i1) corresponds to a start current. The brake ECU 100 applies the target current iFL* thus calculated to the solenoid of the pressure-increasing linear control valve 44FL.

Subsequently, the brake ECU 100 increments the timer value t by 1 in step S23, and temporarily exits the hydraulic pulsation prevention control subroutine. Since the hydraulic pulsation prevention control routine is incorporated into the basic hydraulic control routine, the hydraulic pulsation prevention control routine is repeated at a predetermined operation cycle.

The pressure-increasing linear control valve 44FL is opened during the increase in the current applied to the solenoid. When the pressure-increasing linear control valve 44FL is opened, the wheel cylinder pressure PwFL detected by the wheel cylinder pressure sensor 53FL varies (increases). The brake ECU 100 makes the determination in step S21 by detecting the variation in the wheel cylinder pressure PwFL. Specifically, the brake ECU 100 determines whether the pressure-increasing linear control valve 44FL is opened or not based on whether or not the variation amount ΔPwFL of the wheel cylinder pressure PwFL is larger than a valve-opening determination value ΔPwref set beforehand. When determining that the variation amount ΔPwFL of the wheel cylinder pressure PwFL is larger than the valve-opening determination value ΔPwref set beforehand, the brake ECU 100 makes "No" determination in step S21, and proceeds to step S24.

The brake ECU 100 determines whether the timer value t is zero or not in step S24. When it is not zero, the brake ECU 100 resets the timer value t (clears the timer value t to zero) in step S25. Then, the brake ECU 100 calculates the target current iFL* of the pressure-increasing linear control valve 44FL from the equation (3) described below in step S26.

$$iFL^* = i\text{ open} + Ga \cdot E \quad (3)$$

In the equation (3), i open is specified as the target current iFL* at the point at which the pressure-increasing linear control valve 44FL is opened. Specifically, the target current i*FL at the point at which the pressure-increasing linear control valve 44FL is first determined to be opened in step S21 is set to i open. E is the deviation between the target hydraulic pressure P* and the wheel cylinder pressure PwFL. Ga is a feedback gain. The feedback gain Ga may be a fixed value, but in the present embodiment, it is set to a value that is increased with time after the pressure-increasing linear control valve 44FL is opened. With this, the target current iFL* is not suddenly changed when the calculation method of the target current iFL* is changed (S22→S26). The feedback gain Ga is also set such that the increasing gradient of the target current iFL* is larger after the pressure-increasing linear control valve 44FL is opened than the increasing gradient before it is opened. Therefore, due to the slow opening of the pressure-increasing linear control valve 44FL, the hydraulic pulsation that is likely to be generated at the moment of opening the pressure-increasing linear control valve 44FL can be prevented, and the wheel cylinder pressure can be controlled to quickly reach the target hydraulic pressure P*. The brake ECU 100 applies the target current iFL* thus calculated to the solenoid of the pressure-increasing linear control valve 44FL.

After calculating the target current iFL* in step S26, the brake ECU 100 temporarily exits the hydraulic pulsation prevention control subroutine. In this way, the target current iFL* increases, and when the deviation E becomes less than the threshold value Eref (S13: No), the energization of the pressure-increasing linear control valve 44FL is stopped (S12). The pressure-increasing linear control valve 44FL is repeatedly opened and closed by the hydraulic control described above during the period in which the target hydraulic pressure P* increases due to the depression of the brake pedal 10. When the depressing speed Vp of the brake pedal 10 exceeds the threshold value Vpref, the hydraulic pulsation prevention control (S20) is switched to the normal feedback control (S15). The timer value t is cleared to zero when no brake request is issued (S21: No) or when the control is switched to the normal feedback control (S15).

Figure 4A:
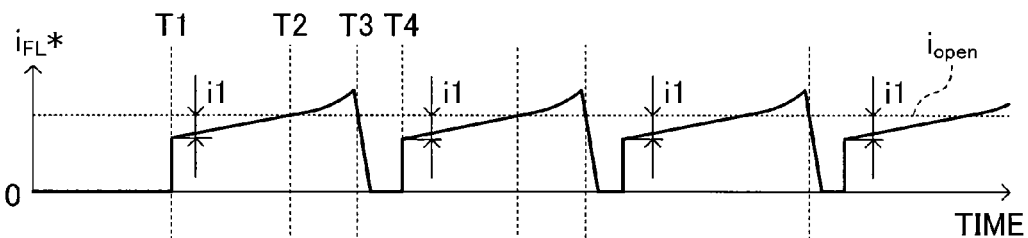
FIGS. 4A-4E are graphs illustrating a change in a target current, a wheel cylinder pressure, and a vehicle deceleration, when the hydraulic pulsation prevention control subroutine according to the first embodiment is executed.
Figure 4B:
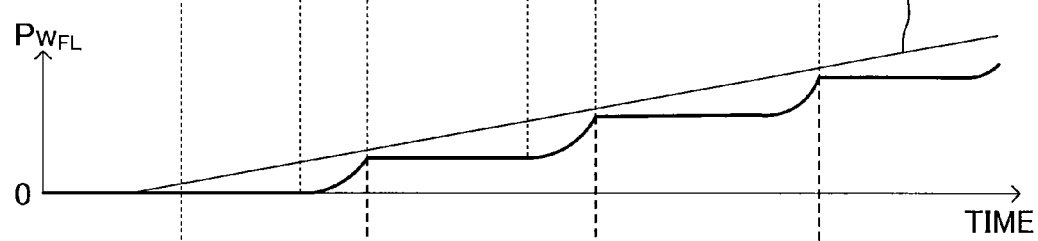

FIG. 4A illustrates the change in the target current iFL* of the pressure-increasing linear control valve 44FL when the hydraulic pulsation prevention control is performed, and FIG. 4B illustrates the change in the wheel cylinder pressure PwFL. As illustrated, the target current iFL* is set to increase with time from a start current that is lower than the valve-opening current i open of the pressure-increasing linear control valve 44FL by the decrease set value i1 (times T1 to T2). After the pressure-increasing linear control valve 44FL is opened, the target current iFL* increases with a gradient larger than the increasing gradient before the pressure-increasing linear control valve 44FL is opened (times T2 to T3). When the deviation E becomes less than the threshold value Eref (time T3), the target current iFL* decreases to zero with a temporal gradient. For easy understanding, iFL*=0 in step S12 in FIG. 2. However, when the pressure-increasing linear control valve 44FL is closed, the target current iFL* is desirably decreased with a temporal gradient. When the pressure-increasing linear control valve 44FL is closed, it is always unnecessary to decrease the target current iFL* to zero. The target current iFL* may be decreased to a small current value by which the pressure-increasing linear control valve 44FL cannot keep opened.

The wheel cylinder pressure PwFL keeps a constant hydraulic pressure before the pressure-increasing linear control valve 44FL is opened, and increases after the time T2 at which the pressure-increasing linear control valve 44FL is opened. When the pressure-increasing linear control valve 44FL is closed at the time T3, the wheel cylinder pressure PwFL keeps the hydraulic pressure at that point. When the deviation E becomes not less than the threshold value Eref due to the increase in the target hydraulic pressure P* (time T4), the energization of the pressure-increasing linear control valve 44FL is restarted. According to this hydraulic pulsation prevention control, the hydraulic pulsation of the wheel cylinder pressure PwFL that is likely to occur upon the opening of the valve is prevented. In this case, the wheel cylinder pressure PwFL has a stepwise change as illustrated in FIG. 4B.

The brake ECU 100 also executes the hydraulic pulsation prevention control for the pressure-increasing linear control valve 44FR for the front-right wheel. In this case, when the wheel cylinder pressure PwFR for the front-right wheel is changed in a stepwise manner at the same timing as (in synchronism with) the timing of the wheel cylinder pressure PwFL for the front-left wheel, the variation in the deceleration of the vehicle increases, which might provide uncomfortable feeling to a driver. In view of this, the brake ECU 100 executes the hydraulic pulsation prevention control routine illustrated in FIG. 3B.

The hydraulic pulsation prevention control routine for the front-right wheel has a process in step S32 instead of the process in step S22 in the hydraulic pulsation prevention control routine for the front-left wheel described above. The other processes are basically the same as those in the hydraulic pulsation prevention control routine for the front-left wheel, except that the subject to be controlled is the wheel cylinder pressure for the front-right wheel. Therefore, the processes same as those in the hydraulic pulsation prevention control routine for the front-left wheel are identified by the same step numbers as in the hydraulic pulsation prevention control routine for the front-left wheel, and the description of these processes will be omitted.

In step S32, the brake ECU 100 calculates the target current iFR* of the pressure-increasing linear control valve 44FR from the equation (4) described below.

$$iFR^* = (i\,\text{open} - i2) + K \cdot t \qquad (4)$$

In this equation, i open represents a valve-opening current of the pressure-increasing linear control valve 44FR. K is an increase coefficient, and it is set to the same value as the increase coefficient used in step S22. t is a timer value similarly used in step S22. i2 is a decrease set value set beforehand, and it is set to be a value different from the decrease set value i1 used in step S22. In the present embodiment, the decrease set value i2 is set smaller than the decrease set value i1.

Figure 4C:
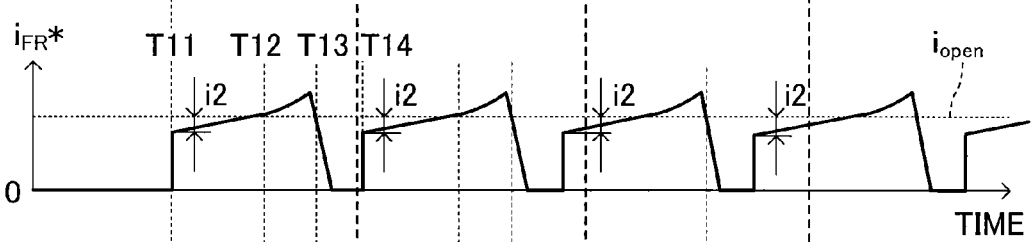
Figure 4D:
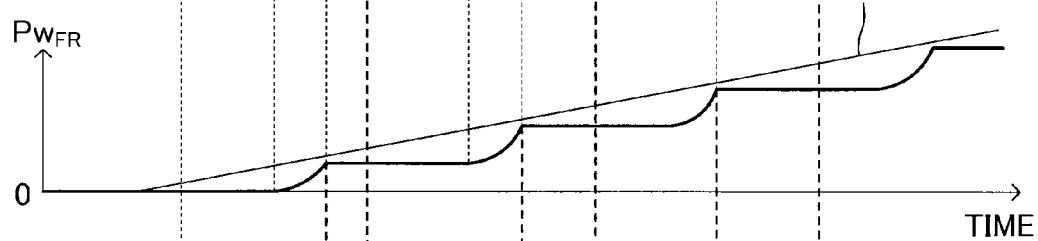

With this, the target current iFR* is set to increase with time from the start current that is lower than the valve-opening current i open of the pressure-increasing linear control valve 44FR by the decrease set value i2 (times T11 to T12) as illustrated in FIG. 4C. In this case, the start current is set to be the value closer to the valve-opening current than the start current of the pressure-increasing linear control valve 44FL for the front-left wheel. Accordingly, the pressure-increasing linear control valve 44FR for the front-right wheel is opened at an earlier timing than the pressure-increasing linear control valve 44FL for the front-left wheel (time T12). With this, the wheel cylinder pressure PwFR for the front-right wheel starts to increase at the timing earlier than the timing of the wheel cylinder pressure PwFL for the front-left wheel as illustrated in FIG. 4D.

After the pressure-increasing linear control valve 44FR is opened, the brake ECU 100 calculates the target current iFR* of the pressure-increasing linear control valve 44FR from the equation (5) described below in step S26.

$$iFR^* = i\,\text{open} + Ga \cdot E \qquad (5)$$

In this equation, Ga is a feedback gain set with a time function same as that for Ga used in the calculation equation (3) for the target current iFL*. i open is specified as the target current iFR* when the pressure-increasing linear control valve 44FR for the front-right wheel is opened. Thus, after the pressure-increasing linear control valve 44FR is opened, the target current iFR* increases with a gradient larger than the increasing gradient before the pressure-increasing linear control valve 44FR is opened (times T12 to T13).

In this case, the wheel cylinder pressure PwFR for the front-right wheel increases with a gradient same as the increasing gradient of the wheel cylinder pressure PwFL for the front-left wheel (times T12 to T13). However, the timing (time T12) at which the wheel cylinder pressure PwFR for the front-right wheel starts to increase is earlier than the timing (time T2) at which the wheel cylinder pressure PwFL for the front-left wheel starts to increase. Therefore, the wheel cylinder pressure PwFR reaches a pressure-increase stop threshold value earlier than the wheel cylinder pressure PwFL for the front-left wheel (the deviation E becomes less than the threshold value Eref). Accordingly, the valve-closing timing (time T3, time T13) can be different between the pressure-increasing linear control valve 44FR for the front-right wheel and the pressure-increasing linear control valve 44FL for the front-left wheel.

Figure 4E:
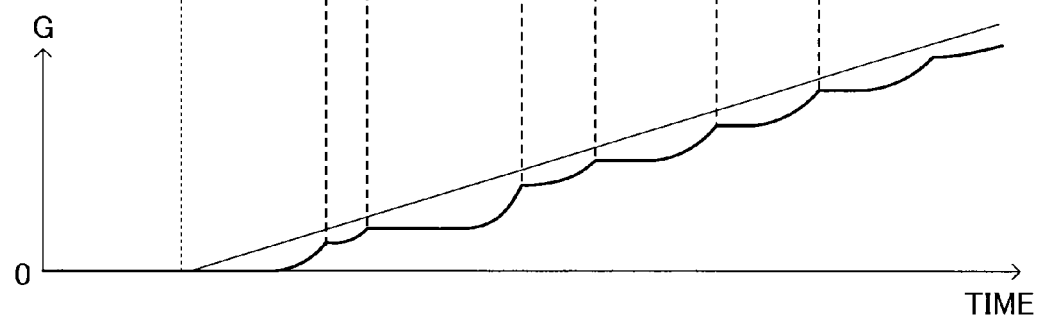

Since the increasing wheel cylinder pressures PwFL and PwFR become constant at the moment of closing the pressure-increasing linear control valves 44FL and 44FR, the variation in the wheel cylinder pressures PwFL and PwFR is large. However, this variation can be distributed by closing the respective valves at different timings. With this control, the variation in the deceleration G of the vehicle is suppressed as illustrated in FIG. 4E.

According to the present embodiment described above, when the brake pedal 10 is slowly depressed, different start currents are set for the target current iFL* for the front-left wheel and the target current iFR* for the front-right wheel by using the decrease set values i1 and i2, whereby the frequency of matching the timing at which the pressure-increasing linear control valve 44FL is closed and the timing at which the pressure-increasing linear control valve 44FR is closed can be reduced. Accordingly, the variation in the vehicle deceleration can be suppressed, whereby comfort for the driver can be enhanced. In addition, the hydraulic pulsation prevention control is executed, whereby abnormal noise caused by vibration of a pipe can be prevented.

When the brake pedal 10 is depressed with a speed exceeding the threshold value Vpref, it is unnecessary to set the flow rate of the operating fluid flowing through the pressure-increasing linear control valve 44 to be very small, so that the pressure-increasing linear control valve 44 is not repeatedly opened and closed. Therefore, the wheel cylinder pressure does not have a stepwise change. In view of this, in the present embodiment, the feedback control is executed with priority being placed on the increasing speed of the wheel cylinder pressure, whereby braking force can appropriately be generated.

<Second Embodiment According to Deceleration Variation Prevention Control>

Next, a second embodiment of a deceleration variation prevention control will be described. In the first embodiment, the pressure-increasing linear control valves 44FL and 44FR are prevented from being closed at the same timing by using the decrease set values i1 and i2, in order to suppress the variation in the vehicle deceleration. On the other hand, in the second embodiment, the timing at which energization is started is shifted between the pressure-increasing linear control valves 44FL and 44FR in order to prevent the pressure-increasing linear control valves 44FL and 44FR from being closed at the same timing.

Figure 5:
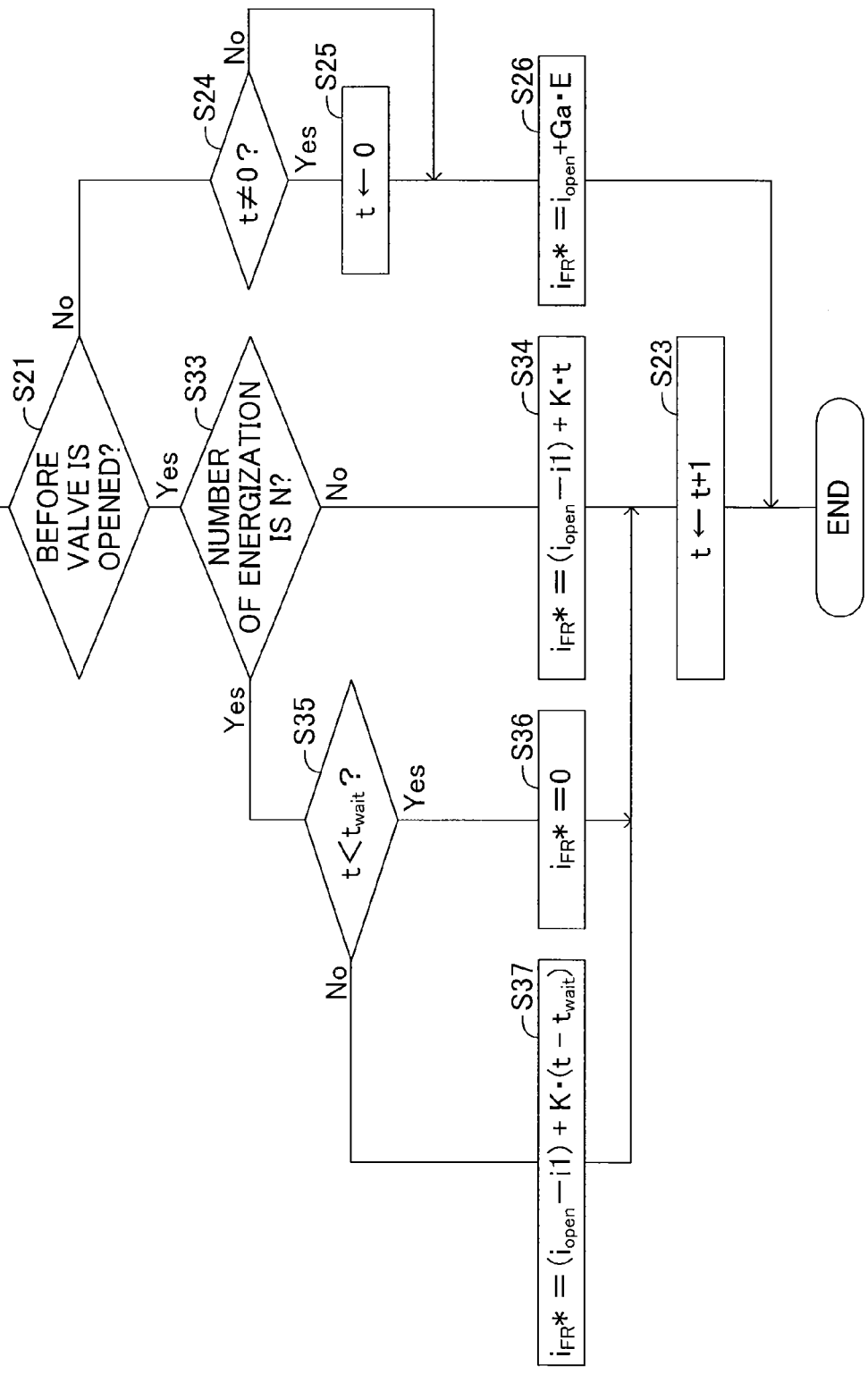
FIG. 5 is a flowchart illustrating a hydraulic pulsation prevention control subroutine for a front-right wheel according to a second embodiment.

FIG. 5 illustrates the hydraulic pulsation prevention control subroutine for the front-right wheel according to the second embodiment. The hydraulic pulsation prevention control subroutine for the front-left wheel is the same as that in the first embodiment. In the hydraulic pulsation prevention control subroutine for the front-right wheel according to the second embodiment, processes in steps S33, S34, S35, S36, and S37 are executed instead of the process in step S32 in the first embodiment. The processes in FIG. 5 same as those in the first embodiment are identified by the same step numbers, and their description will be omitted.

When determining that it is before the pressure-increasing linear control valve 44FR is opened in step S21, the brake ECU 100 determines whether the number of times of energization of the pressure-increasing linear control valve 44FR after the start of the hydraulic pulsation prevention control is N (N=1 in the present embodiment) or not in step S33. When the brake pedal 10 is slowly depressed, the pressure-increasing linear control valve 44 cannot keep its slight opening degree as described above. Therefore, the energization state and the non-energization state of the pressure-increasing linear control valve 44 are alternately switched, whereby the pressure-increasing linear control valve 44 is repeatedly opened and closed. The number of times of energization in step S33 represents the number of energization, wherein the period from the start of the energization till the changeover to the non-energization state (the period in which the energization request is outputted) is counted as one energization. The number of energization is counted by the brake ECU 100. When no brake request is issued (S21: No) or when the control is switched to the normal feedback control (S15), the number of energization is reset (cleared to zero).

Just after the start of the hydraulic pulsation prevention control due to the slow depression of the brake pedal 10, the pressure-increasing linear control valve is never energized. Therefore, the brake ECU 100 makes "No" determination in step S33, and proceeds to step S34. In step S34, the brake ECU 100 calculates the target current iFR* of the pressure-increasing linear control valve 44FR by using the equation (6) described below. i open is the valve-opening current of the pressure-increasing linear control valve 44FR for the front-right wheel.

$$iFR^* = (i\text{ open} - i1) + K \cdot t \tag{6}$$

The equation (6) is a calculation equation using the decrease set value i1 and the increase coefficient K, which are the same as those in step S22 in the hydraulic pulsation prevention control for the front-left wheel. Therefore, a start current that is the initial value of the target current iFR* is (i open−i1) that is the same as the target current iFL* for the front-left wheel. Then, the brake ECU 100 increments the timer value t by 1, and temporarily exits the hydraulic pulsation prevention control subroutine. Since the hydraulic pulsation prevention control routine is incorporated into the basic hydraulic control routine, the hydraulic pulsation prevention control routine is repeated at a predetermined operation cycle.

When the amount of a current applied to the pressure-increasing linear control valve 44FR is increased due to the repeated process described above, the pressure-increasing linear control valve 44FR is opened during the increase (S21: No), and the processes in steps S24 to S26 are executed. When the deviation E becomes less than the threshold value Eref after that (S13: No), the energization of the pressure-increasing linear control valve 44FR is temporarily stopped (S12).

Figure 6A:
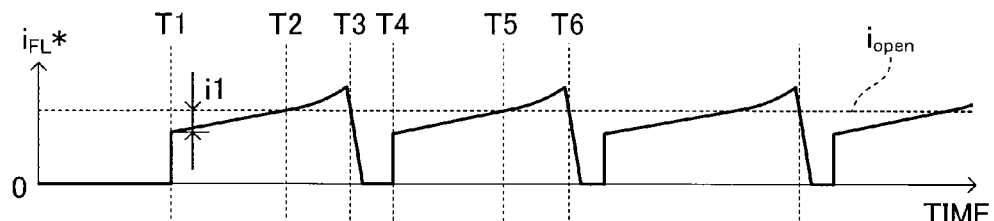
FIGS. 6A-6E are graphs illustrating a change in a target current, a wheel cylinder pressure, and a vehicle deceleration, when the hydraulic pulsation prevention control subroutine according to the second embodiment is executed.
Figure 6B:
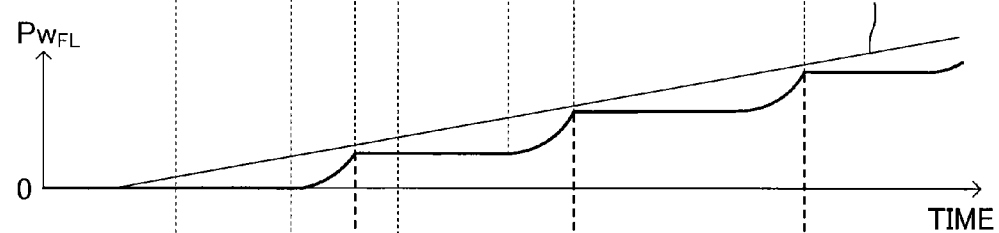
Figure 6C:
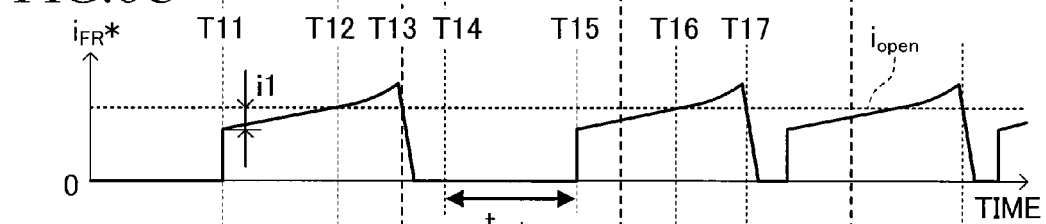
Figure 6D:
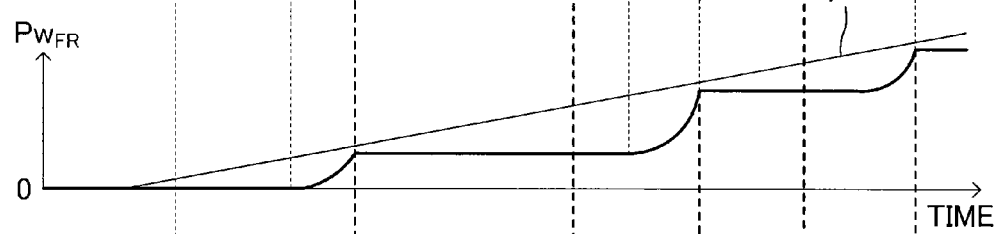

When the target hydraulic pressure P* for the left wheels and the target hydraulic pressure P* for the right wheels are set to be the same value, the timing of instructing to energize the pressure-increasing linear control valve 44FL and the timing of instructing to energize the pressure-increasing linear control valve 44FR are easy to match. In the second embodiment, the start current is calculated in the same calculation equation for the left wheel and the right wheel, so that the waveform (rectangular waveform) of the target current iFR* in the first energization is similar to the waveform (rectangular waveform) of the target current iFL* as illustrated in FIGS. 6A and 6C. Therefore, the pressure-increasing linear control valve 44FL for the front-left wheel and the pressure-increasing linear control valve 44FR for the front-right wheel might be opened and closed at the same timing even after that. In view of this, in the second embodiment, the timing of starting the second energization after the first energization is finished is shifted between the left wheel and the right wheel to prevent the pressure-increasing linear control valve 44FL and the pressure-increasing linear control valve 44FR from being closed at the same timing after that. The process for this control corresponds to steps S33, S35, S36, and S37 described below.

During the period in which the target hydraulic pressure P* increases due to the depression of the brake pedal 10, the deviation E again becomes not less than the threshold value Eref, so that the hydraulic pulsation prevention control is started. In this case, the determination in step S21 becomes "Yes", and the brake ECU 100 determines whether the number of times of energization of the pressure-increasing linear control valve 44FR is N times or not in step S33. At this point, the energization of the pressure-increasing linear control valve 44FR is made once. In the present embodiment, N is set to 1. Therefore, the brake ECU 100 makes "Yes" determination in step S33, and then, proceeds to step S35.

The brake ECU 100 determines whether the time value t is less than a set time t wait or not in step S35. The set time t wait sets beforehand a period in which the hydraulic control by the pressure-increasing linear control valve 44FR is inhibited. The set time t wait is not limited to a fixed value, and it may be variable. For example, the energization time (from T11 to T13 in FIG. 6C) of the pressure-increasing linear control valve 44FR in the first energization is counted, and a time different from this energization time may be set as the set time t wait.

The time value t is zero (t=0) when the determination process in step S35 is first made. Therefore, the brake ECU 100 makes "Yes" determination in step S35, sets the target current iFR* of the pressure-increasing linear control valve 44FR to zero (iFR*=0) in next step S26, and then, proceeds to step S23. With this, the pressure-increasing linear control valve 44FR is not energized. The brake ECU 100 repeats the process described above, and when the timer value t is equal to or longer than the set time t wait (S35: No), the brake ECU 100 proceeds to step S37 to calculate the target current iFR* of the pressure-increasing linear control valve 44FR by using the equation (7) described below. This equation (7) is formed by changing the second term in the right side in the equation (6).

$$iFR^* = (i\ open - i1) + K \cdot (t - t\ wait) \quad (7)$$

Accordingly, the start current that is the initial value of the target current iFR* becomes (i open−i1). In this case, the energization of the pressure-increasing linear control valve 44FR is started later than the original energization start timing with a delay of the set time t wait. The target current iFR* increases to open the pressure-increasing linear control valve 44FR due to the repetition of the above process. When the deviation E between the target hydraulic pressure P* and the wheel cylinder pressure PwFR becomes less than the threshold value Eref, the energization of the pressure-increasing linear control valve 44FR is stopped.

After the pressure-increasing linear control valve 44FR is energized twice, the determination in step S33 always becomes "No". Therefore, the period in which the hydraulic control for the pressure-increasing linear control valve 44FR is inhibited is not set.

FIG. 6 illustrates the change in a target current, a wheel cylinder pressure, and a vehicle deceleration when the hydraulic pulsation prevention control according to the second embodiment is executed. FIGS. 6A and 6B illustrate the change in the target current iFL* for the pressure-increasing linear control valve 44FL and the change in the wheel cylinder pressure PwFL. FIGS. 6C and 6D illustrate the change in the target current iFR* for the pressure-increasing linear control valve 44FR and the change in the wheel cylinder pressure PwFR. FIG. 6E illustrates the change in the vehicle deceleration G. When the brake pedal 10 is depressed, the pressure-increasing linear control valve 44FL and the pressure-increasing linear control valve 44FR are energized at almost the same timing (times T1 and T11). In this case, since the target current iFL* and the target current iFR* are calculated by the same calculation equation, their valve-opening timings become almost the same (times T2 and T12) and their valve-closing timings become almost the same (times T3 and T13).

Figure 6E:
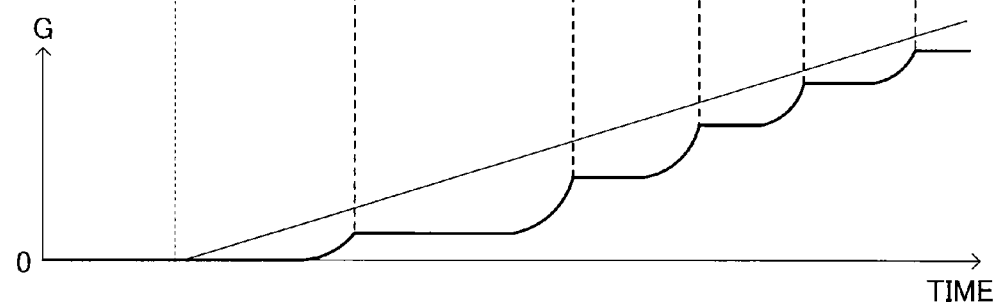

However, the second energization of the pressure-increasing linear control valve 44FR is delayed by the set time t wait. Therefore, the energization start timing of the pressure-increasing linear control valve 44FR is delayed to the time T15, although this timing is originally at the time T14. With this process, the pressure-increasing linear control valve 44FR can be closed at the timing (T17) different from the timing (T6) at which the pressure-increasing linear control valve 44FL is closed. Consequently, the variation in the vehicle deceleration G can be suppressed as illustrated in FIG. 6E.

As described above, according to the deceleration variation prevention control according to the second embodiment, a period in which the hydraulic control is inhibited is set for the pressure-increasing linear control valve 44 for either one of the left wheel and the right wheel. Therefore, the timing at which the current value is increased from the start current can be different between the pressure-increasing linear control valve 44FL and the pressure-increasing linear control valve 44FR. With this, the timing at which the pressure-increasing linear control valve 44FL is closed and the timing at which the pressure-increasing linear control valve 44FR is closed can easily be shifted. As a result, the variation in the vehicle deceleration can be suppressed, whereby comfort for a driver can be enhanced. The execution of the hydraulic pulsation prevention control can prevent the occurrence of abnormal noise caused by vibration of pipes. The period in which the hydraulic control is inhibited is not set during the initial braking in which the hydraulic control is executed first. This can prevent vehicle deflection, and can prevent a driver from feeling discomfort.

As in the first embodiment, when the brake pedal 10 is depressed with a speed exceeding the threshold value Vpref, the feedback control is executed with priority being placed on the increasing speed of the wheel cylinder pressure, whereby braking force can appropriately be generated.

While the vehicle brake control device according to the embodiments of the present invention has been described, the present invention is not limited to the above embodiments, and various modifications are possible without departing from the spirit of the invention.

For example, in the above embodiments, the deceleration variation prevention control is executed for the pressure-increasing linear control valves 44FL and 44FR for the front wheels. However, the subject to which the deceleration variation prevention control is executed may be the pressure-increasing linear control valves 44RL and 44RR for the rear wheels, and may be the pressure-increasing linear control valves 44FL, 44FR, 44RL, and 44RR for the front and rear wheels.

In the above embodiments, the wheel cylinder pressure can independently be adjusted for each of front and rear wheels. However, the wheel cylinder pressure can independently be adjusted for each of only the left and right front wheels, or the wheel cylinder pressure can independently be adjusted for each of only the left and right rear wheels, for example.

In the second embodiment, the timing of inhibiting the hydraulic control is at the second energization of the pressure-increasing linear control valve 44FR. However, this timing can optionally be set. The subject to which the hydraulic control is inhibited may be either one of the pressure-increasing linear control valves for left and right wheels.

In the above embodiments, the deceleration variation prevention control is executed upon the operation of the pressure-increasing linear control valve 44. However, instead of this configuration, or in addition to this configuration, the deceleration variation prevention control may be executed upon the operation of the pressure-decreasing linear control valve 45. For example, it may be configured to prevent the valve-closing timing of the pressure-decreasing linear control valve 45FL for the front-left wheel from matching the valve-closing timing of the pressure-decreasing linear control valve 45FR for the front-right wheel, when the brake pedal 10 is slowly returned. In this case, the control subject for the control routines illustrated in FIGS. 2, 3, and 5 may be specified as the pressure-decreasing linear control valve 45FL and the pressure-decreasing linear control valve 45FR. In step S13, the brake ECU 100 may determine whether or not a deviation (P*−Pw) between the target hydraulic pressure P* and the wheel cylinder pressure Pw becomes equal to or less than a negative threshold value Eref, and in step S14, the brake ECU 100 may determine whether or not a return speed Vp' of the brake pedal 10 is equal to or less than a threshold value Vpref'. The target current i* for the pressure-decreasing linear control valve 45 may be set in the same manner as the target current i* for the pressure-increasing linear control valves 44FL and 44FR in the hydraulic pulsation prevention control subroutine in the first or second embodiment. Specifically, a different start current may be set between the pressure-decreasing linear control valve 45FL and the pressure-decreasing linear control valve 45FR, or the timing at which the current value is increased may be set different between the pressure-decreasing linear control valve 45FL and the pressure-decreasing linear control valve 45FR by setting the control inhibiting period t wait.

The invention claimed is:

1. A vehicle brake control device comprising:
a wheel cylinder provided to each of plural wheels and receiving a hydraulic pressure of operating fluid to apply braking force on the wheels;
a power hydraulic source that outputs a high hydraulic pressure even if a brake operation is not performed;
a pressure adjusting device that adjusts a hydraulic pressure outputted from the power hydraulic source, and transmits the adjusted hydraulic pressure to each of the wheel cylinders; and
a hydraulic control unit that controls the operation of the pressure adjusting device to execute a hydraulic control such that the hydraulic pressure transmitted to the wheel cylinder follows a target hydraulic pressure, the pressure adjusting device including an independent hydraulic control valve of a solenoid type that independently adjusts the hydraulic pressure outputted from the power hydraulic source, and supplies the adjusted hydraulic pressure to the wheel cylinders of the left and right wheels of at least the front wheels or the rear wheels, and the hydraulic control unit controlling the operation of the independent hydraulic control valve to independently control a hydraulic pressure transmitted to the wheel cylinders of the left and right wheels, wherein
the vehicle brake control device includes a valve-closing timing matching prevention unit that prevents a valve-closing timing of the independent hydraulic control valve corresponding to the left wheel of at least the front wheels or the rear wheels and a valve-closing timing of the independent hydraulic control valve corresponding to the right wheel of at least the front wheels or the rear wheels from matching, during the hydraulic control by the hydraulic control unit;
an operation speed detection unit that detects a brake operation speed; and
an operation speed response unit that allows the operation of the valve-closing timing matching prevention unit based on the brake operation speed when the brake operation speed is not more than a set speed, and inhibits the operation of the valve-closing timing matching prevention unit based on the brake operation speed when the brake operation speed exceeds the set speed.

2. A vehicle brake control device comprising:
a wheel cylinder provided to each of plural wheels and receiving a hydraulic pressure of operating fluid to apply braking force on the wheels;
a power hydraulic source that outputs a high hydraulic pressure even if a brake operation is not performed;
a pressure adjusting device that adjusts a hydraulic pressure outputted from the power hydraulic source, and transmits the adjusted hydraulic pressure to each of the wheel cylinders; and
a hydraulic control unit that controls the operation of the pressure adjusting device to execute a hydraulic control such that the hydraulic pressure transmitted to the wheel cylinder follows a target hydraulic pressure, the pressure adjusting device including an independent hydraulic control valve of a solenoid type that independently adjusts the hydraulic pressure outputted from the power hydraulic source, and supplies the adjusted hydraulic pressure to the wheel cylinders of the left and right wheels of at least the front wheels or the rear wheels, and the hydraulic control unit controlling the operation of the independent hydraulic control valve to independently control a hydraulic pressure transmitted to the wheel cylinders of the left and right wheels, wherein
the vehicle brake control device includes a valve-closing timing matching prevention unit that prevents a valve-closing timing of the independent hydraulic control valve corresponding to the left wheel of at least the front wheels or the rear wheels and a valve-closing timing of the independent hydraulic control valve corresponding to the right wheel of at least the front wheels or the rear wheels from matching, during the hydraulic control by the hydraulic control unit, wherein
the hydraulic control unit controls energization of the independent hydraulic control valve to increase a current value with a predetermined gradient from a start current lower than a valve-opening current that is a current value upon opening the closed independent hydraulic control valve when a hydraulic adjustment start condition is established, and to decrease the current value when a hydraulic adjustment stop condition is established, and the valve-closing timing matching prevention unit sets a different start current for the independent hydraulic control valve corresponding to the left wheel and the independent hydraulic control valve corresponding to the right wheel.

3. A vehicle brake control device comprising:
a wheel cylinder provided to each of plural wheels and receiving a hydraulic pressure of operating fluid to apply braking force on the wheels;
a power hydraulic source that outputs a high hydraulic pressure even if a brake operation is not performed;
a pressure adjusting device that adjusts a hydraulic pressure outputted from the power hydraulic source, and transmits the adjusted hydraulic pressure to each of the wheel cylinders; and
a hydraulic control unit that controls the operation of the pressure adjusting device to execute a hydraulic control such that the hydraulic pressure transmitted to the wheel cylinder follows a target hydraulic pressure, the pressure adjusting device including an independent hydraulic control valve of a solenoid type that independently adjusts the hydraulic pressure outputted from the power hydraulic source, and supplies the adjusted hydraulic pressure to the wheel cylinders of the left and right wheels of at least the front wheels or the rear wheels, and the hydraulic control unit controlling the operation of the independent hydraulic control valve to independently control a hydraulic pressure transmitted to the wheel cylinders of the left and right wheels, wherein
the vehicle brake control device includes a valve-closing timing matching prevention unit that prevents a valve-closing timing of the independent hydraulic control valve corresponding to the left wheel of at least the front wheels or the rear wheels and a valve-closing timing of the independent hydraulic control valve corresponding to the right wheel of at least the front wheels or the rear wheels from matching, during the hydraulic control by the hydraulic control unit, wherein
the hydraulic control unit controls energization of the independent hydraulic control valve to increase a current value with a predetermined gradient from a start current lower than a valve-opening current that is a current value upon opening the closed independent hydraulic control valve when a hydraulic adjustment start condition is established, and to decrease the current value when a hydraulic adjustment stop condition is established, and the valve-closing timing matching prevention unit sets a different timing of increasing the current value from the start current between the independent hydraulic control valve corresponding to the left wheel and the independent hydraulic control valve corresponding to the right wheel by setting a control inhibiting period in which the hydraulic control for the independent hydraulic control valve corresponding to either one of the left wheel and the right wheel by the hydraulic control unit is inhibited for a set time, and does not set the control inhibiting period upon initial braking in which the hydraulic control unit performs the hydraulic control first after a brake operation.

* * * * *